United States Patent
Wenzel et al.

(10) Patent No.: US 7,158,677 B2
(45) Date of Patent: Jan. 2, 2007

(54) MATCHING OF DISCRETE CURVES UNDER AFFINE TRANSFORMS

(75) Inventors: Lothar Wenzel, Round Rock, TX (US); Ram Rajagopal, Austin, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 862 days.

(21) Appl. No.: 10/224,043

(22) Filed: Aug. 20, 2002

(65) Prior Publication Data

US 2004/0037467 A1   Feb. 26, 2004

(51) Int. Cl.
G06K 9/46   (2006.01)
(52) U.S. Cl. ............ 382/203; 382/151; 382/199; 382/209
(58) Field of Classification Search ............ 382/141, 382/199, 203, 278, 280, 294, 151, 209
See application file for complete search history.

(56) References Cited

U.S. PATENT DOCUMENTS

| | | | |
|---|---|---|---|
| 5,537,669 A * | 7/1996 | Evans et al. | 382/141 |
| 5,933,523 A | 8/1999 | Drisko et al. | |
| 6,035,066 A | 3/2000 | Michael | |
| 6,240,218 B1 | 5/2001 | Michael et al. | |
| 6,324,299 B1 | 11/2001 | Sarachik et al. | |
| 6,381,366 B1 | 4/2002 | Taycher et al. | |
| 6,411,734 B1 | 6/2002 | Bachelder et al. | |
| 6,421,458 B1 | 7/2002 | Michael et al. | |
| 6,687,402 B1 * | 2/2004 | Taycher et al. | 382/199 |
| 6,807,305 B1 * | 10/2004 | Rajagopal et al. | 382/209 |
| 7,043,081 B1 * | 5/2006 | Silver et al. | 382/209 |
| 2004/0037467 A1 * | 2/2004 | Wenzel et al. | 382/203 |

OTHER PUBLICATIONS

"Numerical Recipes in Fortran 77: The Art of Scientific Computing" (ISBN 0-521-43064-X), Cambridge University Press, pp. 299-306 Copyright 1986-1992.
"State-of-the-Art in Shape Matching", by Remco C. Veltkamp and Michiel Hagedoorn, Utrecht University, Department Computing Science, The Netherlands, 1999, pp. 1-26.
Loncaric, S. 1998. "A Survey of Shape Analysis Techniques", pp. 1-45. (See note under #5 in coversheet).
Alt, H. and Guibas L.J. Discrete Geometric Shapes: Matching, Interpolation, and Approximation, Dec. 3, 1996, pp. 1-34. (See note under #5 in coversheet).

* cited by examiner

Primary Examiner—Gregory Desire
(74) Attorney, Agent, or Firm—Meyertons Hood Kivlin Kowert & Goetzel, P.C.; Jeffrey C. Hood; Mark S. Williams

(57) ABSTRACT

System and method for determining the presence of an object of interest from a template image in an acquired target image, despite of or using various types of affine transformations of the object of interest in the target image. A template image discrete curve is determined from the template image corresponding to the object of interest, and a template curve canonical transform calculated based on the curve. The canonical transform is applied to the template curve to generate a mapped template curve. The target image is received, a target image discrete curve determined, and a target curve canonical transform computed based on the target curve canonical transform. The target canonical transform is applied to the target curve to generate a mapped target curve. Geometric pattern matching is performed using the mapped template and target image discrete curves to generate pattern matching results, and the pattern matching results are output.

46 Claims, 11 Drawing Sheets

PRIOR ART PATTERN MATCHING

PRIOR ART PATTERN MATCHING WITH
CHARACTERIZATION OF THE TEMPLATE IMAGE

MATCHING OF DISCRETE CURVES UNDER AFFINE TRANSFORMS

FIELD OF THE INVENTION

The present invention relates to a system and method for determining the presence of an object of interest in a target image. More specifically, the invention relates to locating regions of a target image that match an object of interest, e.g., in a template image, under affine transforms.

DESCRIPTION OF THE RELATED ART

In many applications it is necessary or desired to determine the presence of an object of interest in a data set, such as a target image. For example, in many image processing applications it is desirable to find one or more matches of a template image in a larger target image. Exemplary machine vision applications include process monitoring, feedback control, and laboratory automation; image and video compression; and jitter compensation in video cameras, among others. Various characteristics may be used in classifying a location in the target image as a match, including luminance pattern information, color pattern information, and color information.

Additionally, the object of interest in the target image may be transformed relative to the known object information, e.g., in the template image. For example, the object of interest in the target image may be shifted, scaled, rotated, stretched, or may have other geometric or topological transformations.

Prior art pattern recognition systems have typically used a template matching technique wherein the stored image or pattern to be located is iteratively compared with various portions of a target image in which it is desired to locate the template. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels, e.g., the grayscale value associated with the pixels, in the template image, or a selected subset of sample pixels, against each of the possible various locations in the target image.

Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching may produce the location of the match in the image, the quality of match and possibly the orientation, size and/or scaling of the match.

The template is typically compared with portions of the target image by utilizing a correlation based pattern matching, i.e., using normalized two dimensional correlation (normalized 2D correlation). This 2D correlation is performed by placing the template over the respective portion of the image and performing a complete normalized 2D correlation between the pixels in the template and the pixels in the corresponding portion of the image, using values associated with the pixels, such as grayscale values. This correlation generally produces a correlation value which indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

The normalized 2D correlation operation is based on a point-wise multiplication wherein the template is first conceptually placed over a portion of the image, the value associated with each point or pixel of the template is multiplied with the corresponding pixel value in the respective portion of the target image, and the result is summed over the entire template. Also, as noted above, the template image is generally compared with each possible portion of the target image in an iterative fashion. This approach is thus very computationally intensive.

FIG. 2 illustrates the pattern matching process of the prior art which involves characterization of the template with a reduced number of sample pixels. In this process, a characterization of the template is performed to extract features from the template image. In other words, the template is characterized to represent the template image with a lesser number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

Another prior art technique for performing pattern matching is referred to as geometric pattern matching, which may also be referred to as shape matching. Geometric pattern matching generally refers to the detection and use of geometric features in an image, such as boundaries, edges, lines, etc., to locate geometrically defined objects in the image. The geometric features in an image may be reflected in various components of the image data, including, for example, luminance (gray-scale intensity), hue (color), and/or saturation. Typically, geometric features are defined by boundaries where image data changes, e.g., where two differently colored regions abut. These geometric features may be represented by one or more discrete curves in an image, where each discrete curve includes a sequence of points (e.g., pixels) in the image which define the feature (or a portion thereof). Geometric pattern matching techniques are often required to detect an object regardless of scaling, translation, and/or rotation of the object with respect to the template image. For further information on shape or geometric pattern matching, see "State-of-the-Art in Shape Matching" by Remco C. Veltkamp and Michiel Hagedoorn (1999), and "A Survey of Shape Analysis Techniques" by Sven Loncaric, which are both incorporated herein by reference.

An issue that arises in many pattern matching applications is that the target image being analyzed may be an affine-transformed version of the template image. This issue becomes increasingly important when pattern matching is performed with 'real world' image data, i.e., when the target image is acquired in a dynamic time-constrained real-world system, such as from a moving assembly line, where the relative position or orientation of the target object with respect to an image acquisition device (e.g., a camera) may not be precisely maintained. In these circumstances the view angle of the camera with the target object may differ by a moderate amount each time a target image is acquired, thereby introducing affine distortions between the target image and the template image which are not limited to translation, scaling, and rotation. Current pattern matching techniques do not readily handle this broader class of transforms (i.e., affine transforms) between the target image and the template image.

Therefore, an improved system and method is desired for determining the presence of an object of interest in a data set. For example, in an image pattern matching application, an improved system and method is desired which can determine the presence of an object of interest in a target image despite various types of affine transformations of the object of interest in the target image relative to the "template" object of interest.

SUMMARY OF THE INVENTION

One embodiment of the present invention comprises a computer-implemented system and method for locating regions in a target image that match, at least to a degree, a template image with respect to pattern information. A template image comprising a plurality of points (e.g., pixels) may be received by a computer system. A method to characterize pattern information of the template image may be performed. In one embodiment, the object of interest may comprise the template image, or may be included in the template image.

When a target image is received, e.g., when the target image is acquired by a camera for a machine vision application, the target image may then be searched in order to find one or more regions in the target image matching the pattern information of the template image, referred to as an object of interest. The pattern information may comprise luminance pattern information and/or hue plane pattern information, and may also comprise saturation plane pattern information. Alternatively, the pattern information may comprise RGB (Red Green Blue) pixel information. In one embodiment, the method may proceed as follows:

First, a template image may be received, e.g., from an external source or from a memory medium comprised on a host computer system. A template image discrete curve may be determined based on the template image, where the template image discrete curve corresponds to the object of interest in the template image. A template curve canonical transform may then be determined based on the template image discrete curve, and applied to the template image discrete curve to generate a mapped template image discrete curve. In one embodiment, determining the template image discrete curve may include determining an initial discrete curve from the template image, corresponding to the object of interest in the template image. The initial discrete curve may be normalized, e.g., with respect to length, average position, point distribution, etc., and re-sampled to generate the template image discrete curve. In one embodiment, normalizing and re-sampling the initial discrete curve may include computing an affine arc-length based on the initial discrete curve, and re-sampling the initial discrete curve uniformly based on the computed affine arc-length.

Once the template image has been processed as described above, a target image may be received, e.g., from an image acquisition device, another computer system, or from a memory medium comprised on a host computer system. A target image discrete curve may be determined based on the target image, where the target image discrete curve corresponds to an image object in the target image. A target curve canonical transform may then be determined based on the target image discrete curve, and applied to the target image discrete curve to generate a mapped target image discrete curve. In one embodiment, determining the target image discrete curve may include determining an initial discrete curve from the target image corresponding to an image object in the target image. The initial discrete curve may be normalized, e.g., with respect to length, average position, point distribution, etc., and re-sampled to generate the target image discrete curve. In one embodiment, normalizing and re-sampling the initial discrete curve may include computing an affine arc-length based on the initial discrete curve, and re-sampling the initial discrete curve uniformly based on the computed affine arc-length.

It is noted that applying the template curve canonical transform to the template image discrete curve may include applying the target curve canonical transform to each point in the template image discrete curve to generate corresponding points in the mapped template image discrete curve. Similarly, applying the target curve canonical transform to the target image discrete curve may include applying the target curve canonical transform to each point in the target image discrete curve to generate corresponding points in the mapped target image discrete curve.

In one embodiment, the template curve canonical transform and the target curve canonical transform may respectively operate to transform the template image discrete curve and the target image discrete curve into a canonical form where an affine relationship between the target image discrete curve and the template image discrete curve is converted to a Euclidean relationship between the mapped target image discrete curve and the mapped template image discrete curve. Said another way, the target image discrete curve may be an affine transformed version of the template image discrete curve. In this case, after applying the template curve canonical transform to the template image discrete curve and applying the target curve canonical transform to the target image discrete curve, the resulting mapped target image discrete curve and mapped target image discrete curve may differ by one or more of a translation, and a 2D rotation. In one embodiment, normalizing the discrete curves with respect to average position may remove translation differences between the curves. Similarly, normalizing the discrete curves with respect to length may remove scaling difference between the curves. It should be noted that any of various geometric pattern matching techniques may be utilized in performing the geometric pattern matching.

In one embodiment, receiving the template image, determining the template image discrete curve, determining the template curve canonical transform based on the template image discrete curve, and applying the template curve canonical transform to the template image discrete curve may be performed prior to acquiring the target image, e.g., in a learning phase of the matching process. Then, in a later matching phase, one or more target images may be acquired/received and processed as described.

After the mapped template image and target image discrete curves have been generated, geometric pattern matching may be performed on the mapped target image discrete curve and the mapped template image discrete curve, thereby generating pattern matching results. In one embodiment, performing geometric pattern matching on the mapped target image discrete curve and a mapped template image discrete curve may include computing a similarity metric for the mapped template image discrete curve and the mapped target image discrete curve, and comparing the similarity metric for the mapped template image discrete curve and the mapped target image discrete curve to a match value, where the similarity metric having a value of approximately the match value indicates a substantial match between the template image discrete curve and the target image discrete curve. In one embodiment, prior to computing the similarity metric, the mapped template image discrete curve and the mapped target image discrete curve may be re-sampled uniformly.

In one embodiment, prior to computing the similarity metric, the following steps may be performed one or more times in an iterative manner:

the mapped template image discrete curve and the mapped target image discrete curve may be normalized;

the template curve canonical transform may be applied to the mapped template image discrete curve and the target curve canonical transform may be applied to the mapped target image discrete curve; and the mapped template image discrete curve and the mapped target image discrete curve may be re-sampled uniformly, where at each successive iteration, the mapped template and target discrete curves from the preceding iteration are used as the mapped template and target image discrete curves. In one embodiment, after applying the transforms and prior to re-sampling, the mapped template image discrete curve and the mapped target image discrete curve may be re-normalized.

This iterative process may continue until a stopping condition is met. As one example, the stopping condition may be met when the value of a computed metric matches or exceeds a threshold value. For example, the similarity metric mentioned above may be computed for the two curves at each iteration, and when the metric fails to improve substantially, the iteration may be terminated. In this case, performing the geometric pattern matching afterwards may be unnecessary. For another example, the similarity metric mentioned above may be computed for successive versions of each curve. In other words, with each iteration, a curve may be compared (via the similarity metric) to the previous version of itself (i.e., from the previous iteration). Once each of the curves has substantially converged to a respective stable form, the two curves (i.e., the converged template and target curves) may be compared.

After the geometric pattern matching has been performed, the pattern matching results may be output, for example, to a memory store on the computer, to a display screen, and/or to an external system coupled to the computer, such as a server computer system. In one embodiment, the pattern matching results may be used to trigger an action. For example, in a machine vision system, the pattern matching results may indicate a part which does not match the template image, e.g., a part which fails a quality assurance test and the part may be rejected.

Thus, in various embodiments, the method operates to locate regions of a target image that match a template image with respect to pattern information under affine transformations.

BRIEF DESCRIPTION OF THE DRAWINGS

A better understanding of the present invention can be obtained when the following detailed description of the preferred embodiment is considered in conjunction with the following drawings, in which.

Figure 1:
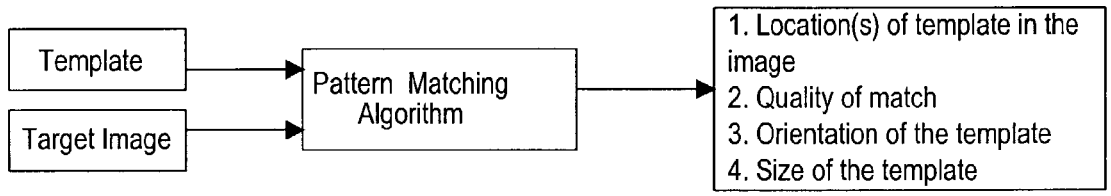
FIG. 1 illustrates pattern matching as performed in prior art.
Figure 2:
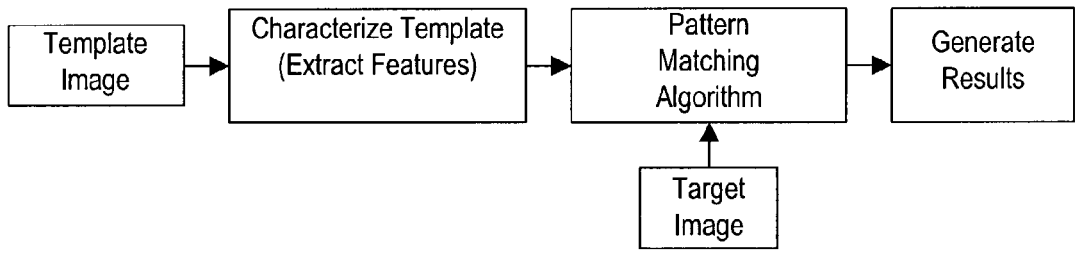
FIG. 2 illustrates pattern matching performed in prior art, which includes characterization of the template image with fewer pixels for reduced computation.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE EMBODIMENTS

Incorporation by Reference

The following patent applications are hereby incorporated by reference in their entirety as though fully and completely set forth herein:

U.S. patent application Ser. No. 09/227,506 titled "Pattern Matching System and Method Which Performs Local Stability Analysis for Improved Efficiency" filed on Jan. 6, 1999, whose inventors are Dinesh Nair, Lothar Wenzel, Nicolas Vazquez, and Samson DeKey.

U.S. Provisional Patent Application Ser. No. 60/371,474, titled "Pattern Matching System Utilizing Discrete Curve Matching with a Mapping Operator", filed on Apr. 10, 2002.

The following publications are hereby incorporated by reference in their entirety as though fully and completely set forth herein:

The National Instruments IMAQ™ IMAQ Vision Concepts Manual; and

"Efficient Matching Of Discrete Curves", by Lothar Wenzel, National Instruments, Austin, Tex., appended herein as Appendix A.

Figure 3:
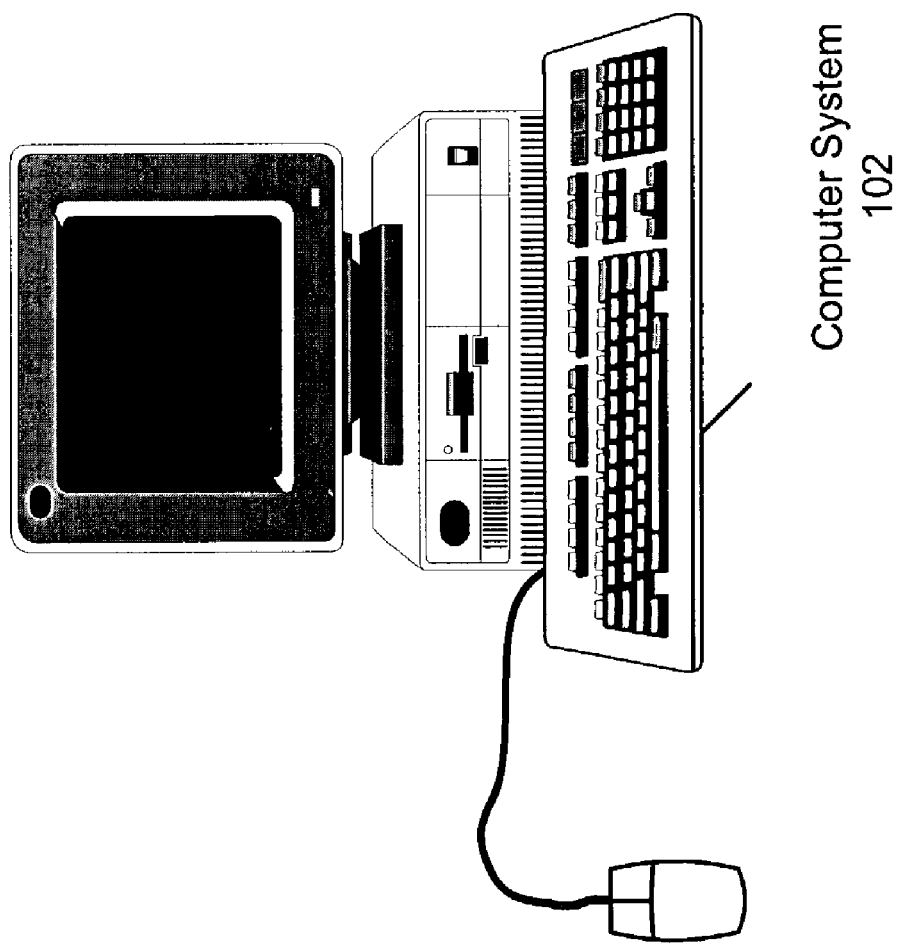
FIG. 3 illustrates a computer system suitable for performing pattern matching according to one embodiment of the present invention.

FIG. 3—Computer System

FIG. 3 illustrates a computer system 102 which may perform pattern match location according to one embodiment of the present invention. The computer system 102 may comprise one or more processors, a memory medium, display, and an input device or mechanism, such as a keyboard or mouse, and any other components necessary for a computer system.

The computer system 102 may perform a pattern characterization method of a template image and may use information determined in this analysis to determine whether a target image matches the template image and/or to locate regions of the target image which match the template image, with respect to pattern information. Images that are to be matched are preferably stored in the computer memory and/or received by the computer from an external device.

The computer system 102 preferably includes one or more software programs operable to perform the pattern match determination and/or location. The software programs may be stored in a memory medium of the computer system 102 The term "memory medium" is intended to include various types of memory, including an installation medium, e.g., a CD-ROM, or floppy disks 104, a computer system memory such as DRAM, SRAM, EDO RAM, Rambus RAM, etc., or a nonvolatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing pattern match location according to the methods or flowcharts described below.

Figure 4:
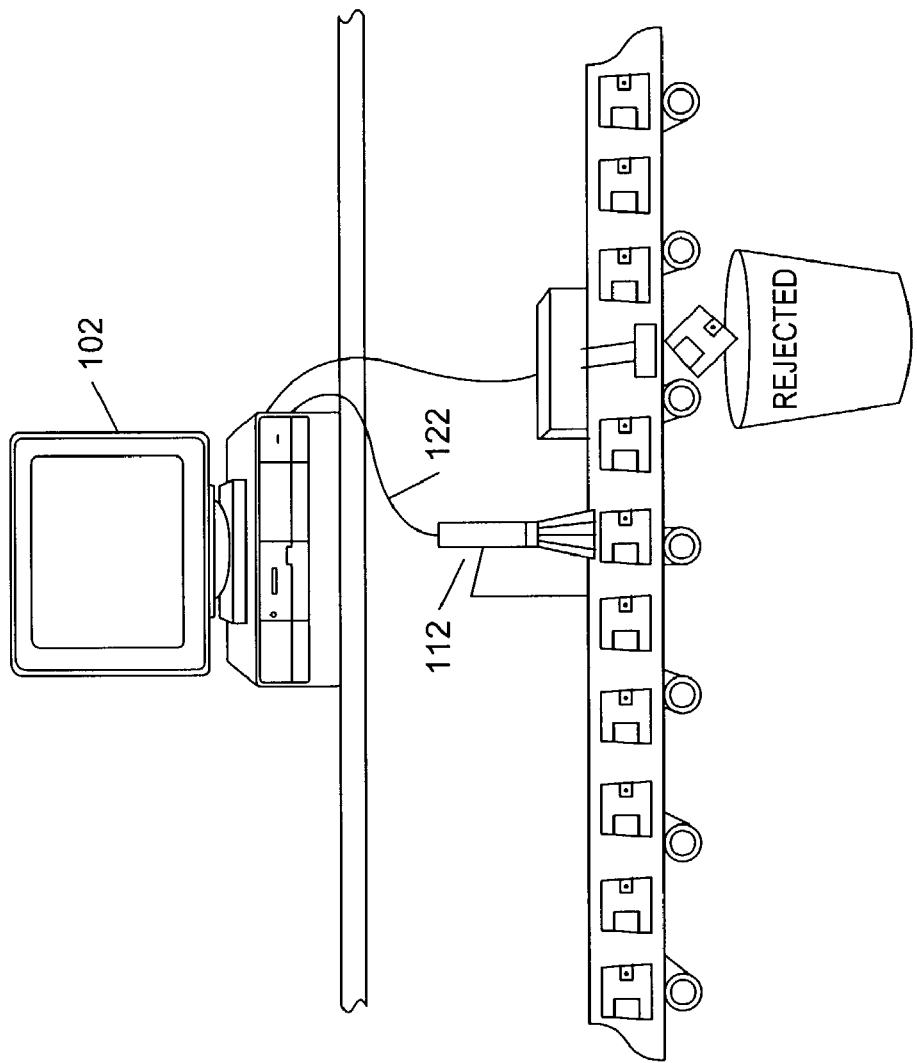
FIG. 4 illustrates an image acquisition (video capture) system for acquiring images.

FIG. 4—Machine Vision System

FIG. 4 illustrates a machine vision system or image acquisition system, which is an example of one application of the present invention. The pattern match determination/location techniques described herein may be used in various types of machine vision or motion control applications. For example, the computer 102 may be embodied in various form factors and/or architectures, e.g., a robot or embedded device, among others. It is also noted that the pattern match location techniques described herein may be performed in any of various manners, either in software, programmable logic, or hardware, or a combination thereof.

In the machine vision system of FIG. 4, computer system 102 is coupled to a camera 112 and operates to receive one or more images. The computer system 102 may be operable to perform a pattern characterization method to determine pattern information of the template image. In the present application, the term "template image" is used to refer to either an entire image, or a portion of an image, e.g., a region of interest (ROI). The computer system 102 may also be operable to perform a search of a target image to locate target image regions that match the pattern information of the template image. As described below, the search may be performed to locate matching regions with any of various degrees of exactness, as appropriate for a particular application.

Figure 5:
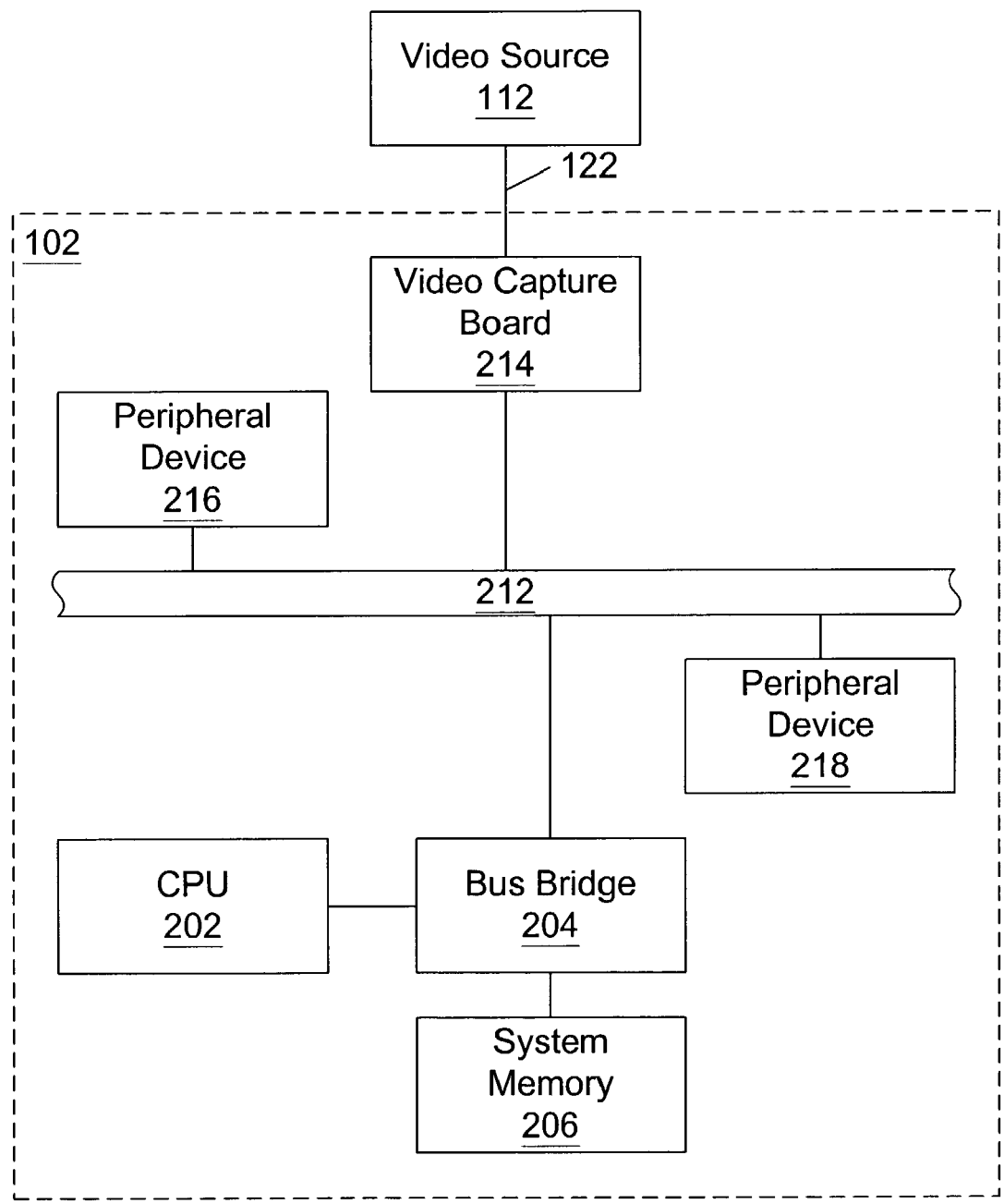
FIG. 5 is a high-level block diagram of the image acquisition system.

FIG. 5—Image Acquisition System Block Diagram

FIG. 5 is a high-level block diagram of the image acquisition system of FIG. 4 for acquiring an image for pattern matching according to one embodiment of the present invention. It is noted that the block diagram of FIG. 5 is exemplary only, and other computer system architectures may be used as desired. For example, the present invention may be implemented in a "smart camera", which integrates a sensor, analog to digital (A/D) converter, CPU, and communications devices together in a single unit. The present invention may be embodied in other architectures, devices, or embodiments, as desired.

As shown in FIG. 5, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. One or more regions of interest (ROI) may be specified in the target image which are desired to be searched for regions having pattern information that matches the pattern information of a template image, or the entire target image may be searched.

The system memory 206 may store a template image. The system memory 206 may also receive and/or store one or more other images, such as selected regions of interest (ROIs) in the template image or another image, or acquired target images. The system memory 206 also preferably stores software according to the present invention which operates to analyze the pattern information of the template and target images. The software may also be executable to perform various pattern match location methods, as described below. The system memory 206 may store the pattern information of the template image for comparison to various regions in the target image during the pattern match location process.

The term "image," as used herein, may refer to any of various types of images. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, frame-grabber, scanner, etc. An image may be a complex image, in which pixel values (positions) have a real part and an imaginary part.

It is noted that, in a pattern match application, the pattern information of the template image may be pre-calculated and stored in the computer, and the actual template image is then not required to be stored or used for subsequent pattern match determination/location operations with respective target images. Thus, when a target image is acquired, the software may compare the pattern information of the target image with the pre-computed pattern information of the template image.

The present invention is preferably implemented in one or more software programs which are executable by a processor or CPU. The software program(s) of the present invention are preferably stored in a memory medium of a computer as described above.

Theory

Figure 6:
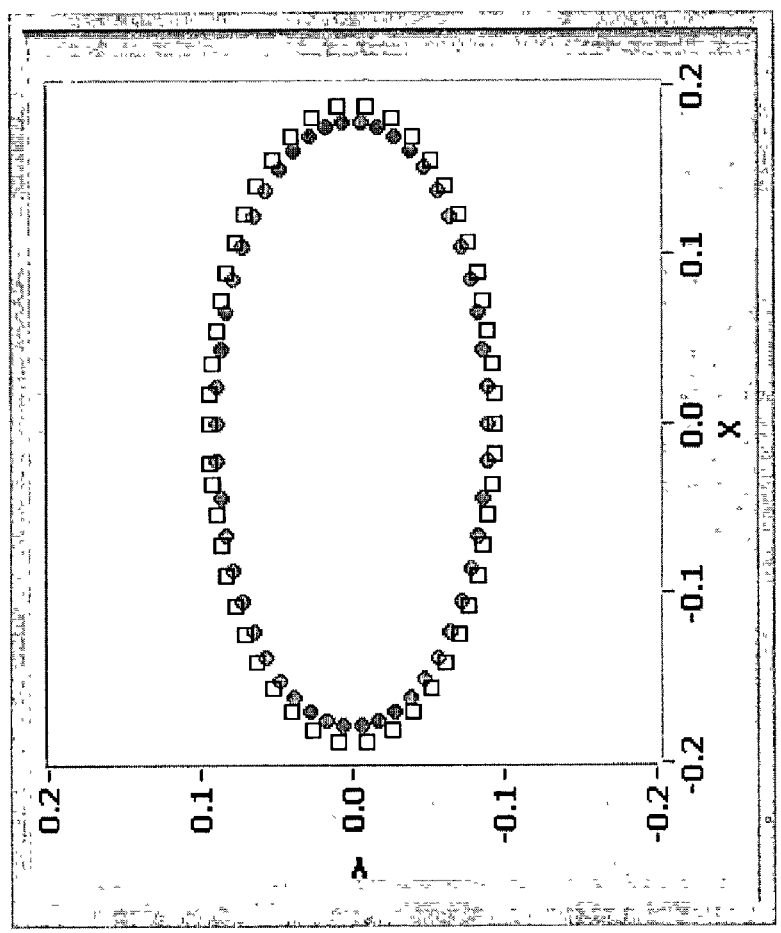
FIG. 6 illustrates the variance of regular uniform sampling under affine transforms.

In Wenzel [2001] pattern matching methods are described using equally sampled planar curves, i.e., uniformly sampled planar curves. Uniformly sampled discrete curves maintain this uniformity under shift, scaling, and rotation. Unfortunately, this is not the case for affine transforms. As FIG. 6 demonstrates, sampling patterns of two curves equivalent under a specific affine transform can differ significantly. More specifically, the inner ellipse (marked by solid diamonds) is a normalized affine image of an equally sampled circle, and the outer ellipse (marked by squares) is a normalized version of an equally sampled affine image of the circle. Thus, as FIG. 6 shows, there is a conflict between equidistantly sampled curves and affine transforms of the curves. In other words, the order of these operations (i.e. sampling and affine transform) is critical. To overcome this conflict, an affine invariant curve length definition may be used based on affine differential geometry.

The pattern matching approach described herein uses ideas of shape analysis in conjunction with affine differential geometry to provide fast and robust geometric pattern matching techniques that may be suitable for use in systems where real-time constraints apply. For example, in many commercial applications, a complete matching routine must be completed in a time frame on the order of 20–50 msec. On the other hand, robustness is an essential requirement. The methods described herein substantially meet both of these goals.

It should be noted that the discrete curves used in these pattern matching methods have a certain direction, and that concatenated versions of these points do not generate intersections. The distances between adjacent points are usually constant, i.e., the curves are sampled equidistantly.

Shape Based Geometrical Description

Shape analysis has many applications in engineering, biology, chemistry, geography, medicine, and image processing. General shape spaces are well understood, e.g. Kendall et al. [1999], Kendall [1977,1984], Carne [1990].

Such spaces are based on specific sets of transformation groups G that lead to Riemannian metrics and Lie group theoretical approaches. An example is Kendall's shape space $$\sum_{m}^{k}$$

of k points in an m-dimensional Euclidean space where the group G of transformations consists of translation, rotation, and scaling. A suitable distance in $$\sum_{m}^{k}$$

is the Riemannian metric ρ. This metric can be defined as follows. Let $A_p$ and $B_p$ be so-called preshapes of two configurations A and B. A and B are point sets of same size k in $R^m$. Preshapes are normalized versions of the original shape (centered at 0 and Euclidean norm 1). The Riemannian metric ρ in the shape space is defined as follows ρ(A,B)=arccos{trace(Λ)} where the matrix Λ is the diagonal m by m matrix with positive elements given by square roots of the eigenvalues of $A_p^T B_p B_p^T A_p$, except the smallest diagonal element which is negative if det($B_p^T A_p$)<0. Related distances are full and partial Procrustes distances (e.g. Kent [1992]). The term 'full' stands for minimization over the full set of similarity transforms and the term 'partial' stands for minimization only for translation and rotation.

In general, Euclidean matching of shapes in higher dimensional spaces $R^m$ cannot be cast as a problem in linear regression. However, affine matching using regression reduces to linear regression for any number of dimensions, and in particular, for planar problems. Such problems can be solved efficiently based on the familiar least squares solution.

However, all these methods assume synchronously sampled shapes. In other words, there must be a one-to-one relation between all points of A and B. In realistic matching scenarios this will rarely be the case. For that reason, it is desirable to sample shapes equidistantly from an affine standpoint.

Affine Arc-Length

Let $(x(s),y(s))$ $0 \leq s \leq 1$ be a closed continuous curve (sufficiently smooth). The affine arc-length is defined as:

$$s(t) = \int_0^t ds \sqrt[3]{|x'(s)y''(s) - x''(s)y'(s)|} \quad 0 \leq t \leq 1 \quad (1)$$

Usually, formula (1) is normalized in the following sense:

$$\sigma(t) = \frac{s(t)}{s(1)} \quad 0 \leq t \leq 1 \quad (2)$$

Veltkamp and Hagedoorn [1999] and others have proven that (2) generates an arc-length that is invariant against affine transforms. In other words, equally sampled discrete curves according to (1) and (2) generate shapes that can be compared directly.

Affine Arc-Length and Affine Matching

Huttenlocher and Kedem [1990] (see also Veltkamp and Hagedoorn [1999]) use a discrete version of affine arc-length to represent the boundary of polygons. Two polygons are regarded as equal if and only if the discrete arc-lengths are equal up to the point of normalization. Hausdorff distances between these representations are used to determine similarities.

In this section the case of arbitrary shapes (non-polygons) is discussed, where cubic splines are used to represent a given shape. Cubic splines have the unique property of minimizing curvature among all possible smooth representations. More precisely, let $a=(a_0, \ldots, a_{N-1})$ be a discrete closed curve in the complex plane. Assume that a does not intersect itself, and that $a_N = a_0$. Let curve a be uniformly sampled. In other words, the curve has the parameterization $\{(t_n, a_n)\}_{n=0, \ldots, N}$ with $t_n = n/N$. Let $a''_n$ be the unknown second derivatives of a cubic spline at positions $t_n$. It follows that $$\frac{(t_n - t_{n-1})}{6} a''_{n-1} + \frac{(t_{n+1} - t_{n-1})}{3} a''_n + \frac{(t_{n+1} - t_n)}{6} a''_{n-1} = \frac{(a_{n+1} - a_n)}{(t_{n+1} - t_n)} - \frac{(a_n - a_{n-1})}{(t_n - t_{n-1})} \quad (3)$$

for $n = 1, \ldots, N-1$ $a''_0 = a''_N$ $$\frac{(a_1 - a_0)}{(t_1 - t_0)} - \frac{1}{3}(t_1 - t_0) a''_0 - \frac{1}{6}(t_1 - t_0) a''_1 = \frac{(a_N - a_{N-1})}{(t_N - t_{N-1})} + \frac{1}{6}(t_N - t_{N-1}) a''_{N-1} + \frac{1}{3}(t_N - t_{N-1}) a''_N$$

System (3) consists of N+1 equations in N+1 unknowns $a''_0, \ldots, a''_n$ and can efficiently be solved with standard techniques. Based on a solution, formulas (1) and (2) can be used to generate normalized affine arc-lengths of a given discrete curve a.

Algorithm 1, presented below, presents one approach for preparing discrete curves for analysis and comparison. More specifically, Algorithm 1 describes a method for filtering and re-sampling a discrete curve for use in pattern matching under affine transforms, where the concept of affine arc-length is used to perform uniform sampling of the curve which is invariant under affine transforms. It is noted that although Algorithm 1 is known in the art, its use in conjunction with methods of the present invention is new, and described below in reference to Algorithm 2. Algorithms 3 and 4 present other embodiments of the present invention, where discrete curves under affine transforms may be matched using a canonical transform, as described below.

Algorithm 1 (Construction of Affine Arc-length of a Given Curve a):

(1.1) Apply low-pass filter to curve a to remove outliers and noise.
(1.2) Use the filtered signal to solve (3).
(1.3) Apply formulas (1) and (2) to generate a normalized affine arc-length.
(1.4) Re-sample the curve equidistantly based on the result of (1.3).

The splining referred to above may be performed as a preprocessing step applied to the curves. The curve that is extracted from the image is given as a set of points that may be very irregular. Therefore, splining and then re-sampling may be applied to the curve such that any extracted curve always has the same number of points, and the points are homogenous. This approach is well-known in the art, and is noted for purposes of thoroughness. In other words, in the pattern matching process described herein, it is noted that in some embodiments, such splining and re-sampling may be part of a pre-processing step applied to every curve extracted from an image. The splining may specifically help to smooth the curve, removing rough edges.

Thus, the above algorithm provides means for normalizing discrete curves for analysis and comparison, e.g., for discrete curve pattern matching. Other methods of normalizing discrete curves are also contemplated, as described below. In particular, a new affine transform, referred to as a "canonical transform" is presented which in various embodiments of the present invention may be used to perform discrete curve matching under affine transforms (e.g., distortions, such as stretching).

Affine Normalization Based on an Optimality Principle

Let $(x_n, y_n)$ $n=0, \ldots, N-1$ be a closed discrete curve in the complex plane, i.e. $x_N = x_0$, $y_N = y_0$. The goal is to determine an affine transform $$\begin{bmatrix} a_{11} & a_{12} \\ a_{21} & a_{22} \end{bmatrix}$$

where $a_{11} a_{22} - a_{12} a_{22} = 1$, and where the sum of all squares of distances between neighbors of the transformed $(x_n, y_n)$ $n=0, \ldots, N$ is minimal. Such an objective normalizes the original discrete curve from an affine standpoint. As a first step, we derive a necessary condition for optimality based on Lagrange multipliers may be derived:

$$\Phi(a_{11}, a_{12}, a_{21}, a_{22}, \lambda) = \sum_{n=0}^{N-1} ([a_{11}(x_{n+1} - x_n) + a_{12}(y_{n+1} - y_n)]^2 + [a_{21}(x_{n+1} - x_n) + a_{22}(y_{n+1} - y_n)]^2) + \lambda(a_{11}a_{22} - a_{12}a_{21} - 1) = \min! \quad (4)$$

$$\frac{\partial \Phi(a_{11}, a_{12}, a_{21}, a_{22}, \lambda)}{\partial a_{11}} = a_{11} \sum_{n=0}^{N-1} (x_{n+1} - x_n)^2 + a_{12} \sum_{n=0}^{N-1} (x_{n+1} - x_n)(y_{n+1}) + \lambda a_{22} = 0$$

$$\frac{\partial \Phi(a_{11}, a_{12}, a_{21}, a_{22}, \lambda)}{\partial a_{12}} = a_{11} \sum_{n=0}^{N-1} (x_{n+1} - x_n)(y_{n+1} - y_n) + a_{12} \sum_{n=0}^{N-1} (y_{n+1} - y_n)^2 - \lambda a_{21} = 0$$

$$\frac{\partial \Phi(a_{11}, a_{12}, a_{21}, a_{22}, \lambda)}{\partial a_{21}} = a_{21} \sum_{n=0}^{N-1} (x_{n+1} - x_n)^2 + a_{22} \sum_{n=0}^{N-1} (x_{n+1} - x_n)(y_{n+1} - y_n) \lambda a_{12} = 0$$

$$\frac{\partial \Phi(a_{11}, a_{12}, a_{21}, a_{22}, \lambda)}{\partial a_{22}} = a_{21} \sum_{n=0}^{N-1} (x_{n+1} - x_n)(y_{n+1} - y_n) + a_{22} \sum_{n=0}^{N-1} (x_{n+1} - y_n)^2 + \lambda a_{11} = 0$$

$$\frac{\partial \Phi(a_{11}, a_{12}, a_{21}, a_{22}, \lambda)}{\partial \lambda} = a_{11}a_{22} - a_{12}a_{21} - 1 = 0$$

The first four equations of (4) can be regarded as an eigenvalue problem, namely $$\begin{bmatrix} 0 & 0 & -B & -C \\ 0 & 0 & A & B \\ B & C & 0 & 0 \\ -A & -B & 0 & 0 \end{bmatrix} \begin{bmatrix} a_{11} \\ a_{12} \\ a_{21} \\ a_{22} \end{bmatrix} = \lambda \begin{bmatrix} a_{11} \\ a_{12} \\ a_{21} \\ a_{22} \end{bmatrix} \text{ with} \quad (5)$$

$$A = \sum_{n=0}^{N-1} (x_{n+1} - x_n)^2$$

$$B = \sum_{n=0}^{N-1} (x_{n+1} - x_n)(y_{n+1} - y_n)$$

$$C = \sum_{n=0}^{N-1} (y_{n+1} - y_n)^2$$

Theorem 1:

The eigenvalues according to (5) are $\lambda^* = \pm\sqrt{AC-B^2}$. All matrix solutions $$\begin{bmatrix} a_{11} & a_{12} \\ a_{21} & a_{22} \end{bmatrix}$$

of system (4) belong to the negative eigenvalue $\lambda^* = -\sqrt{AC-B^2}$. Furthermore, all these matrices are equivalent up to rotations and rotated versions of solution, and are also solutions.

Proof:

The characteristic equation of (5) is $\lambda^4 + 2(B^2-AC)\lambda^2 + (B^4 - 2AB^2C + A^2C^2) = 0$. Solutions are $\lambda^* = \pm\sqrt{AC-B^2}$. According to the Lagrange multiplier approach, the following system may be solved.

$$Aa_{11} + Ba_{12} + \lambda^* a_{22} = 0$$

$$Ba_{11} + Ca_{12} - \lambda^* a_{21} = 0$$

$$Aa_{21} + Ba_{22} - \lambda^* a_{12} = 0$$

$$Ba_{21} + Ca_{22} + \lambda^* a_{11} = 0$$

$$a_{11}a_{22} - a_{12}a_{21} = 1 \quad (6)$$

Substituting $$a_{12} = \frac{A}{\lambda^*} a_{21} + \frac{B}{\lambda^*} a_{22} \text{ and } a_{11} = -\frac{B}{\lambda^*} a_{21} - \frac{C}{\lambda^*} a_{22}$$

in $a_{11}a_{22} - a_{12}a_{21} = 1$ results in $$Aa_{21}^2 + 2Ba_{21}a_{22} + Ca_{22}^2 = -\lambda^*.$$

Because of $(\sqrt{A}a_{21} \pm \sqrt{C}a_{22})^2 = Aa_{21}^2 \pm 2\sqrt{AC}a_{21}a_{22} + Ba_{22}^2 \geq 0$ and $\sqrt{AC} \geq \pm B$ the result that $\lambda^* = -\sqrt{AC-B^2}$ follows, which results in the 1-dimensional parameterization $$a_{11} = \frac{\lambda^*}{A} a_{22} \mp \frac{B}{\lambda^* A} \sqrt{-\lambda^* A - \lambda^{*2} a_{22}^2} \quad (7)$$

$$a_{12} = \pm \frac{1}{\lambda^*} \sqrt{-\lambda^* A - \lambda^{*2} a_{22}^2}$$

$$a_{21} = -\frac{B}{A} a_{22} \pm \frac{1}{A} \sqrt{-\lambda^* A - \lambda^{*2} a_{22}^2}$$

$$a_{22} = a_{22}$$

The range of valid parameters $a_{22}$ is characterized by $$|a_{22}| \leq \sqrt{\frac{A}{AC - B^2}}.$$

It can be shown (e.g. with the aid of symbolic computation) that any two solutions $$\begin{bmatrix} a_{11}^{(1)} & a_{12}^{(1)} \\ a_{21}^{(1)} & a_{22}^{(1)} \end{bmatrix} \text{ and } \begin{bmatrix} a_{11}^{(2)} & a_{12}^{(2)} \\ a_{21}^{(2)} & a_{22}^{(2)} \end{bmatrix}$$

of (7) generate matrices $$\begin{bmatrix} a_{11}^{(1)} & a_{12}^{(1)} \\ a_{21}^{(1)} & a_{22}^{(1)} \end{bmatrix} \begin{bmatrix} a_{11}^{(2)} & a_{12}^{(2)} \\ a_{21}^{(2)} & a_{22}^{(2)} \end{bmatrix}^{-1}$$

that represent rotations.

Finally, it can easily be seen that for matrices $$\begin{bmatrix} a_{11} & a_{12} \\ a_{21} & a_{22} \end{bmatrix} \text{ satisfying (6)}$$

the same is true for all rotated versions $$\begin{bmatrix} \cos(\varphi) & \sin(\varphi) \\ -\sin(\varphi) & \cos(\varphi) \end{bmatrix} \begin{bmatrix} a_{11} & a_{12} \\ a_{21} & a_{22} \end{bmatrix}.$$

To guarantee that these solutions represent minima, the Hessian of $$L(a_{11}, a_{12}, a_{21}, a_{22}) = (a_{11}^2 + a_{21}^2)A + 2(a_{11}a_{12} + a_{21}a_{22})B + (a_{21}^2 + a_{22}^2)C$$

is computed, giving:

$$\left( \frac{\partial^2 L(a_{11}, a_{12}, a_{21}, a_{22})}{\partial a_{ij} \partial a_{kj}} \right)_{ijkl} = \begin{pmatrix} 2A & 2B & 0 & 0 \\ 2B & 2C & 0 & 0 \\ 0 & 0 & 2A & 2B \\ 0 & 0 & 2B & 2C \end{pmatrix}$$

The latter matrix is positive semi-definite, which concludes the proof.

q.e.d.

According to Theorem 1, curves can be normalized where any specific solution (6) can be chosen to characterize normalized versions of a given curve. In particular, the value $a_{22}=0$ is a feasible parameter. The resulting solution is $$\Gamma = \begin{bmatrix} a_{11} & a_{12} \\ a_{21} & a_{22} \end{bmatrix} = \begin{bmatrix} \frac{B}{\sqrt{A\sqrt{AC-B^2}}} & \frac{-A}{\sqrt{A\sqrt{AC-B^2}}} \\ \frac{\sqrt{A\sqrt{AC-B^2}}}{A} & 0 \end{bmatrix} \quad (8)$$

where A, B, and C are defined above in equation (5). Thus, equation (8) is an expression for the canonical transform which may be calculated from and for each discrete curve in an image, i.e., the transform $\Gamma$ is curve dependent. The transform $\Gamma$ is applicable in methods for matching discrete curves under affine transforms, according to various embodiments of the present invention, as described below.

Applications

Let $a=(a_0, \ldots, a_{N-1})$ and $b=(b_0, \ldots, b_{N-1})$ be two discrete sets of points in the complex plane representing closed discrete polygons, none of which intersect themselves. The goal is the determination of a similarity measure between a and b where affine transforms are valid operations. It is assumed that both polygons are mathematically positively oriented. The essential step is a translation of the original problem into a second one that simplifies the situation. An affine matching procedure may be replaced with a matching routine where shift, rotation, and scaling are valid operations.

For example, the latter may be based on a similarity measure such as:

$$d(\bar{a}, \bar{b}) = 1 - \max_{j=0,\ldots,N-1} \left| \sum_{n=0}^{N-1} \bar{a}_{n+j} \bar{b}_n^* \right|^2 \quad (9)$$

where $\bar{a}$ and $\bar{b}$ are normalized versions of a and b, and where a value of (substantially) 0 indicates a match. In other words, curves a amd b may be normalized with respect to length and distribution according to the following expressions (for example):

$$\sum_{n=0}^{N-1} \bar{a}_n = \sum_{n=0}^{N-1} \bar{b}_n = 0 \text{ and } \sum_{n=0}^{N-1} |\bar{a}_n|^2 = \sum_{n=0}^{N-1} |\bar{b}_n|^2 = 1 \quad (10)$$

$$\hat{a} = \Gamma_a a$$

$$\hat{b} = \Gamma_b b \quad (11)$$

For further details see Wenzel et al. [2001]. According to Theorem 1, polygons a and b can be normalized in such a way that (9) is a similarity measure with the following properties:

i) Affine normalizations according to Theorem 1 are essentially closed operations, i.e. applying (8) a second time to the transformed points results in B=0 and A=C.

The latter equivalency means that $$\begin{bmatrix} a_{11} & a_{12} \\ a_{21} & a_{22} \end{bmatrix} = \begin{bmatrix} 0 & -1 \\ 1 & 0 \end{bmatrix}.$$

ii) Normalization according to Theorem 1 maintains the property of avoiding the selfintersections of a single curve with itself.

iii) Metric (9) can be used as an induced metric for polygons a and b.

iv) (9) is equal to zero if and only if a and b are equivalent in the affine sense.

To see the correctness of (i), let A*, B*, and C* be the second generation of A,B, and C, respectively, giving:

$$B^* = \sum_{n=0}^{N-1} ([a_{11}(x_{n+1}-x_n) + a_{12}(y_{n+1}-y_n)][a_{21}(x_{n+1}-x_n) + a_{22}(y_{n+1}-y_n)])$$

$$= a_{11}a_{21}A + (a_{11}a_{22} + a_{12}a_{21})B + a_{12}a_{22}C = 0$$

Based on this result, the identities $A^*=C^*=\sqrt{AC-B^2}$ can be derived. Proposition (ii) follows from the fact that the affine transform generated by Theorem 1 is regular. Affine transforms translate lines into lines and the intersecting point of two lines is translated into an interesting point of the image lines. The proofs for propositions (iii) and (iv) are straightforward.

Algorithm 2 presents a method for matching polygons a and b based on Theorem 1 above. In other words, Algorithm 2 addresses the issue of matching discrete curves wherein the number of points is fixed and the points are not subject to redistribution. More specifically, Algorithm 2 introduces the use of the canonical transform $\Gamma$ in a pattern matching process, without relying on the affine arc-length normalization of Algorithm 1. It is noted that polygons a and b have the same number of points-otherwise, a match would clearly not be possible.

Algorithm 2 (Matching of Polygons a and b Based on Theorem 1):

(2.1) Apply canonical affine transform (8) to $\bar{a}$ and $\bar{b}$ in the sense of Theorem 1 (i.e., equations (11)). Normalize resulting objects according to (10), resulting in $\bar{a}$ and $\bar{b}$.

(2.2) Match $\bar{a}$ and $\bar{b}$ based on (9).

(2.3) Polygons a and b match if and only if the value of d ($\bar{a},\bar{b}$) is (close to) 0.

Figure 7A:
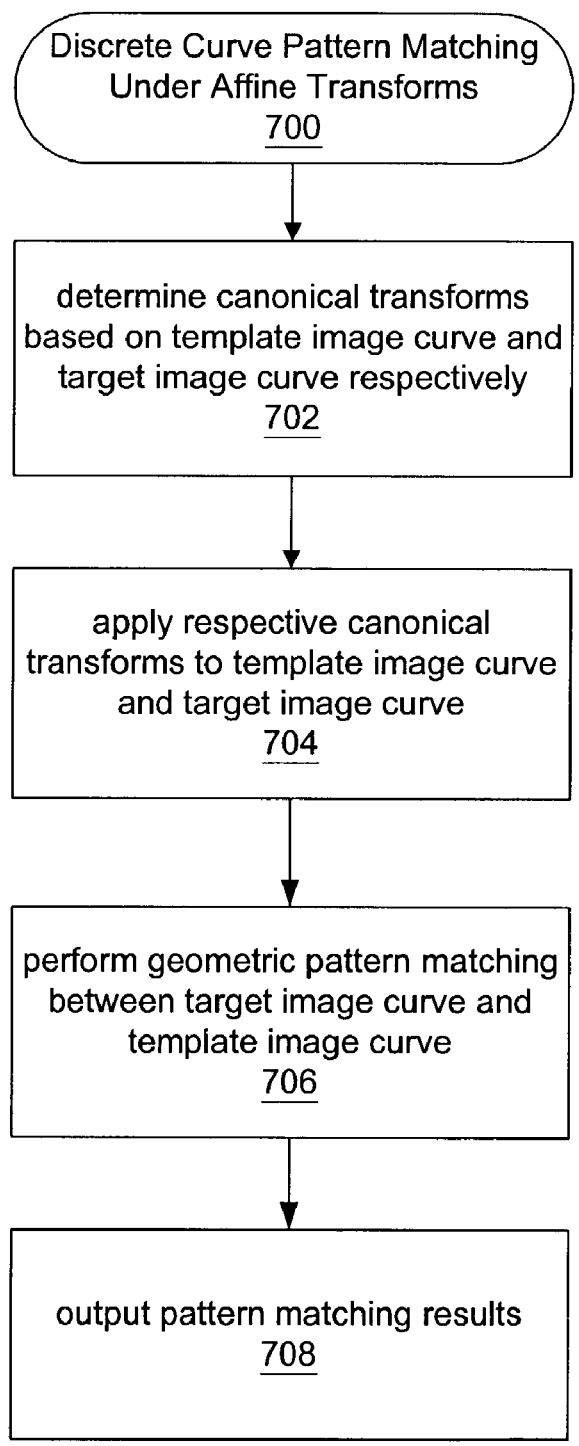
FIGS. 7A and 7B are flowchart diagrams illustrating embodiments of a method for locating regions of a target image that match a template image under affine transforms.
Figure 7B:
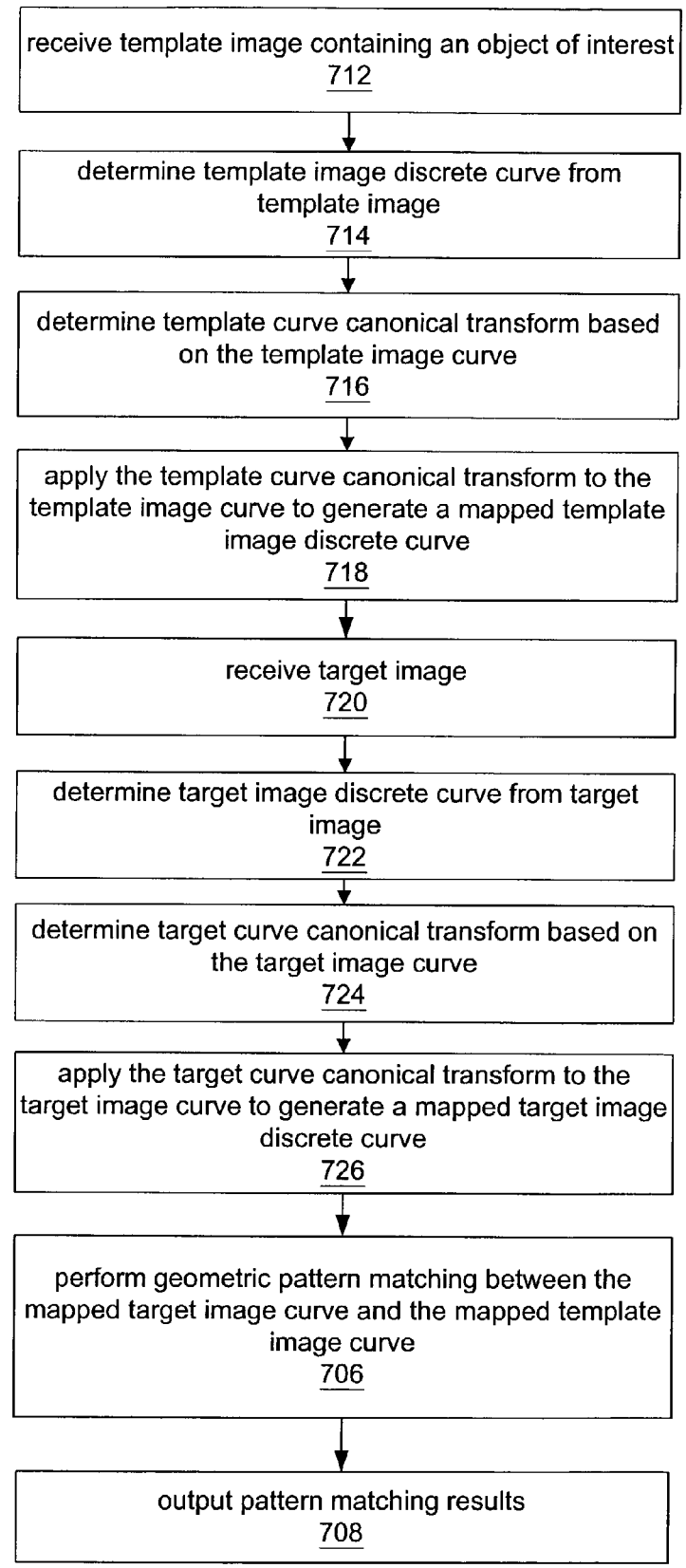

FIGS. 7A and 7B—Methods for Performing Pattern Matching Under Affine Transforms

As mentioned above, in many applications the set of transforms a template can undergo is broader than shift, scaling, and rotation. For example, in a target image, the object of interest may be stretched, based on, for example, camera angle. Some transforms cannot easily be formalized, but effects resulting from changing camera positions and/or orientations relative to the original scene can be modeled by affine transforms. It is noted that this is at least true for a specific range of parameter changes, but that beyond a certain level, distortions due to perspective become dominant and more generic matching tools may be necessary.

FIGS. 7A and 7B are flowchart diagrams illustrating embodiments of a method for performing pattern matching of discrete curves under affine transforms. More specificaly, the methods illustrates in FIGS. 7A and 7B describe pattern matching methods based on Algorithm 2 above, where the canonical transform of equation (8) is applied to the curves under consideration.

FIG. 7A—Performing a Discrete Curve Pattern Match Under Affine Transforms

FIG. 7A is a high-level flowchart diagram illustrating one embodiment of a method for locating regions of a target image that match an object of interest under affine transforms. The object of interest may comprise a template image, or may be included in a template image. It is noted that in various embodiments, some of the steps may occur in a different order than shown, or may be omitted. Additional steps may also be performed.

As FIG. 7A shows, in 702, a template curve canonical transform may be determined based on a received template image, where the template image includes an object of interest. For example, a template image discrete curve may be determined from the template image, where the discrete curve corresponds to the object of interest. The template curve canonical transform may then be determined based on the template image discrete curve. Similarly, a target curve canonical transform may be determined based on a received target image, where the target image may or may not include an instance of the object of interest. The target image discrete curve may be determined from the target image, where the discrete curve may or may not correspond to the object of interest. The target curve canonical transform may then be determined based on the target image discrete curve. Details of the determination of the canonical transform and its properties are provided above in the Theory section.

In one embodiment, prior to the determination of the template curve canonical transform and the target curve canonical transform, the template image discrete curve and the target image discrete curve may each be normalized. For example, each discrete curve may be normalized with respect to length, e.g., each curve may be normalized to length 1. In one embodiment, the two curves may comprise polygons, with a fixed number of points (vertices) and a fixed point (relative) distribution. In another embodiment, the curves may be general discrete curves which may be normalized and re-sampled in accordance with Algorithm 1 above. In other words, the curves may be smoothed and re-sampled uniformly using the affine arc-length described above. It should be noted that in the case that the discrete curves are polygons with a fixed number of vertices, normalization is generally not performed prior to application of the canonical transform.

In 704, the template curve canonical transform may be applied to the discrete curve from the template image to produce a mapped template image discrete curve, and the target curve canonical transform may be applied to the discrete curve from the target image to produce a mapped target image discrete curve.

In one embodiment, the mapped template image discrete curve and the mapped target image discrete curve may be normalized, e.g., with respect to average position, energy, etc., e.g., per equation (10).

In 706, geometric pattern matching may be performed between the mapped template image discrete curve and the mapped target image discrete curve to generate pattern matching results, i.e., to determine the presence of the object of interest in the target image. For example, the discrete curves may be analyzed and matched in accordance with equation (9) above. Other geometric pattern matching techniques are also contemplated. A more detailed description of geometric pattern matching processes is provided in Wenzel [2001], and in U.S. Provisional Patent Application Ser. No. 60/371,474, titled "Pattern Matching System Utilizing Discrete Curve Matching with a Mapping Operator", which was incorporated by reference above. More specifically, in Wenzel [2001] metrics (9) were further improved by adding appropriate weight functions. It is noted that the same strategy is applicable in the case of affine matching. In other words, the use of weight functions or vectors, as described in Wenzel [2001], is also contemplated in some embodiments of the present invention.

Finally, in 708, pattern matching results may be output based on the geometric pattern matching of 706. For example, the pattern matching results may be output to a printer, to a computer display, to a file, or to an external system, as desired. More detailed descriptions of this pattern matching process are provided below.

FIG. 7B—Detailed Method for Matching Discrete Curves Under Affine Transforms

FIG. 7B is a flowchart diagram of a detailed embodiment of the method of FIG. 7A, where regions of a target image that match an object of interest under affine transforms may be determined. As mentioned above, the object of interest may comprise a template image, or may be included in a template image. As also mentioned above, in various embodiments, some of the steps may occur in a different order than shown, or may be omitted. Additional steps may also be performed.

As FIG. 7B shows, in 712, a template image may be received which includes or contains an object of interest. For example, the object of interest may be a certain feature, pattern, or portion of the template image, such as a closed curve, edge, or boundary, with a distinguishable geometry. The template image may be received from an external system, e.g., from an image acquisition system or other external system over a network, or retrieved from the memory medium of the computer system 102.

Then, in 714, a template image discrete curve may be determined from the template image, where the template image discrete curve corresponds to the object of interest in the template image. In one embodiment, the template image discrete curve may comprise a polygon, i.e., the number of points and their relative distribution may be fixed, in which case normalization of the curve may not be necessary. In another embodiment, determining the template image discrete curve may include determining an initial discrete curve from the template image corresponding to the object of interest in the template image, and normalizing the initial discrete curve (e.g., to length 1) to generate the template image discrete curve, e.g., with respect to length, energy, etc., as described above. In yet another embodiment, normalizing the discrete curve may include re-sampling the initial discrete curve, e.g., uniformly. For example, the initial discrete curve may be normalized and re-sampled based on computed affine arc-lengths, as described above, or using equation (10), among others. Further details of the normalization and re-sampling process are provided below.

In 716, a template curve canonical transform may be determined based on the template image discrete curve, as described in detail above in the Theory section.

Then, as indicated in 718, the template curve canonical transform may be applied to the template image discrete curve to generate a mapped template image discrete curve. As mentioned above, a discrete curve is a sequence of points or pixels which, when concatenated, does not cross itself, and so applying the template curve canonical transform to the template image discrete curve may include applying the transform to each point in the template image discrete curve to generate corresponding points in the mapped template image discrete curve. As mentioned above, in one embodiment, the mapped template image discrete curve may be normalized in accordance with any of various normalization schemes.

In 720, a target image may be acquired. For example, the target image may be acquired from a camera in an automated manufacturing system, such as described above with reference to FIG. 4. As another example, the target image may be retrieved from the memory medium of the computer system 102, or received from an external system, e.g., over a network.

Then, in 722, a target image discrete curve corresponding to a respective object in the target image may be determined from the target image. In other words, a point sequence corresponding to an object in the image may be determined. In various embodiments, the target image discrete curve may be normalized and/or re-sampled, as described above with respect to the template image discrete curve in 714. It should be noted that in the geometric matching methods described herein, the template image discrete curve and any target image discrete curves preferably contain the same number of points, and so in cases where the curves are not polygons with fixed vertex numbers, the curves may be re-sampled to produce respective point sequences of the correct size.

It should be noted that in one embodiment, the target image discrete curve may be an affine transformed version of the template image discrete curve. For example, as described above, in an automated manufacturing application where the target image is of an object of manufacture acquired from a camera, the particular orientation and placement of respective objects may vary due to, for example, deviations in the speed of an assembly line or in the timing of the image acquisition. The differences in view angle of the object with respect to the camera (as compared to the view angle of the template object in the template image) may result in, or be considered, an affine transform between the images, and thus, between the curves in the respective images.

In 724, a target curve canonical transform may be determined based on the target image discrete curve, then in 726, the target curve canonical transform may be applied to the target image discrete curve to generate a mapped target image discrete curve. As mentioned above, applying the target curve canonical transform to the target image discrete curve may include applying the transform to each point in the target image discrete curve to generate corresponding points in the mapped target image discrete curve. As also mentioned above with respect to the mapped template image discrete curve, in one embodiment, the mapped template image discrete curve may be normalized in accordance with any of various normalization schemes.

In one embodiment, the template curve canonical transform and the target curve canonical transform may respectively operate to transform the template image discrete curve and the template image discrete curve into a canonical form where an affine relationship between the target image discrete curve and the template image discrete curve (as described above in 722) is converted to a Euclidean relationship between the mapped target image discrete curve and the mapped template image discrete curve. More specifically, after applying the template curve canonical transform to the template image discrete curve and applying the target curve canonical transform to the target image discrete curve, the resulting mapped target image discrete curve and mapped target image discrete curve may differ by one or more of: a translation and a 2D rotation. In other words, the transforms may effectively reduce the dimensionality of the differences between the curves, facilitating the use of pattern matching techniques which otherwise might not be applicable. The derivation and nature of the canonical transform are described in detail below in the Theory section.

In 706, geometric pattern matching may be performed on the mapped target image discrete curve and the mapped template image discrete curve to determine instances, if any, of the object of interest in the target image. In other words, the geometric pattern matching may be performed to determine whether the mapped target image discrete curve matches the mapped template image discrete curve, for example, using equation (9) above. It is noted that there are a variety of different approaches that may be used in performing the geometric pattern matching. In an exemplary embodiment, a weight vector or mapping operator may be computed based on the template image discrete curve, and possibly the target image discrete curve, which when applied to the discrete curves operates to enhance the differences between the curves.

In one embodiment, performing geometric pattern matching on the mapped target image discrete curve and a mapped template image discrete curve may include computing a similarity metric for the mapped template image discrete curve and the mapped target image discrete curve, and comparing the similarity metric for the mapped template image discrete curve and the mapped target image discrete curve to a match value, where the similarity metric having a value of approximately the match value indicates a substantial match between the template image discrete curve and the target image discrete curve.

Finally, in 728, pattern matching results may be generated based on the geometric pattern matching of 726. For example, as described above, the geometric pattern matching process may compute a metric indicating the degree to which the mapped target image discrete curve matches the mapped template image discrete curve, and the metric may be output, along with the target image or an ID thereof if the metric indicates a match.

In one embodiment, the process may be divided into a learning state and a matching stage, where the computations related to the template image may be performed "off-line", i.e., prior to receiving the target image. In other words, receiving the template image, determining the template image discrete curve, determining the template curve canonical transform based on the template image discrete curve, and applying the template curve canonical transform to the template image discrete curve may be performed prior to acquiring the target image. However, it is noted that these computations are generally inexpensive enough that such a division may be unnecessary.

General Discrete Curve Pattern Matching

Now, the more general case of closed discrete curves $a=(a_0, \ldots, a_{N-1})$ and $b=(b_0, \ldots, b_{N-1})$ that do not intersect themselves in the complex plane is treated. In contrast to preceding cases, a and b are not necessarily vertices of polygons. In other words, the discrete curves may be normalized and re-sampled. Two approaches are presented and compared below.

The first approach is based on normalized affine arc-lengths described above. As a result of the normalization method based on affine arc-length described above, curves a and b may be regarded as equally sampled in the sense of a normalized affine arc-length. This means that curves a and b are comparable and Theorem 1 can be applied, as described below in Algorithm 3.

Algorithm 3 (Matching of Discrete Curves a and b Based on Affine Arc-Lengths):
(3.1) Apply Algorithm 1 to a and b. Let the re-sampled versions be a* and b*.
(3.2) Regard a* and b* as polygons and apply Algorithm 2.
(3.3) Curves a and b match if and only if (2.3) is valid.

Figure 8:
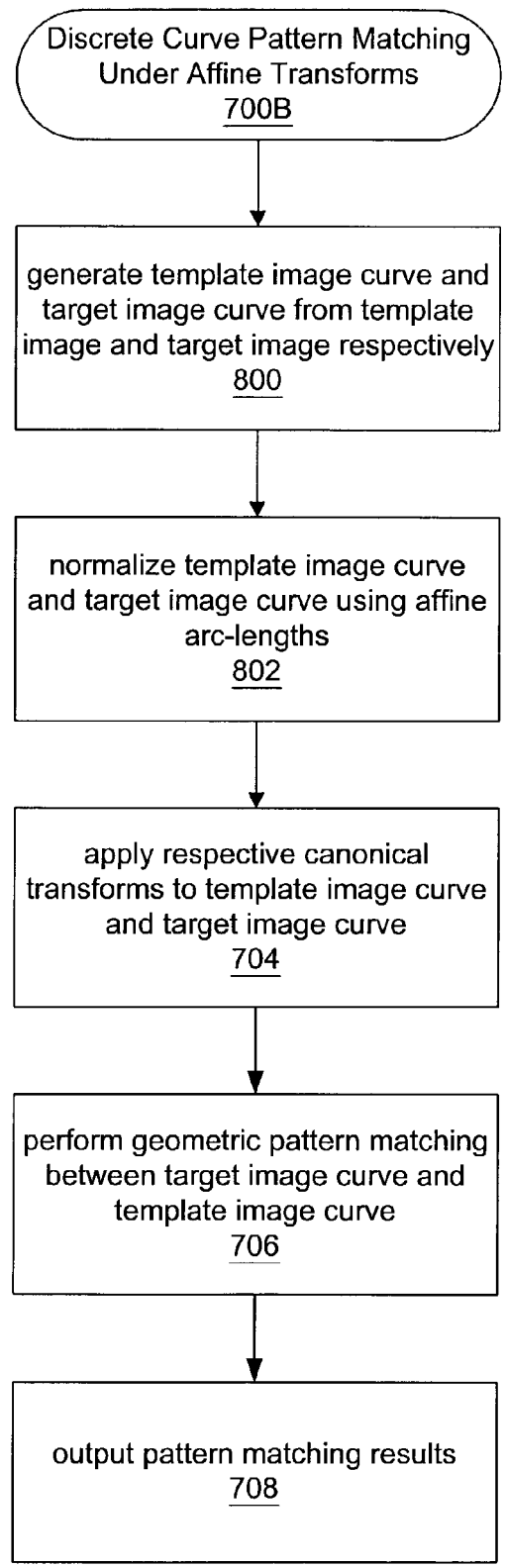
FIG. 8 flowcharts one embodiment of a method for pattern matching under affine transforms using affine arc-length.

FIG. 8—Method for Matching Discrete Curves Using Affine Arc-Lengths

FIG. 8 is a flowchart of one embodiment of a method for matching discrete curves using affine arc-lengths, as described above. As mentioned above, the use of affine arc-lengths allows discrete curves to be sampled uniformly under affine transforms. As noted, in various embodiments, the some of the steps of FIG. 8 may be performed in a different order than shown, or may be omitted. Additional steps may also be performed as desired. Note that where the steps are substantially the same as respective steps of the method of FIG. 7, the descriptions are abbreviated.

As FIG. 8 shows, in one embodiment a template image discrete curve and a target image discrete curve may be generated from a template image and a target image, respectively, as shown in 800. For example, the respective discrete curves may be determined from a template image and a received target image, e.g., from memory, or from an external system, such as from an image acquisition device.

Then, in 802, the template image discrete curve and the target image discrete curve may each be normalized (and re-sampled) using affine arc-lengths, as described above in the Theory section. In other words, Algorithm 1 may be applied to both curves. After normalization, each curve may have the same length (e.g., 1), and may also have the same point distribution (e.g., uniform). It is noted that, as mentioned before, the curves may also be splined, etc., to smooth the curves.

In 704, in one embodiment canonical transforms may be applied to each curve respectively, as described above with reference to FIG. 7. In one embodiment, the canonical transform for each curve may be computed according to equation (8) above, or its equivalent.

After application of the canonical transforms to each curve, geometric pattern matching may be performed, as indicated in 706 and described above. As mentioned above in one embodiment, the geometric pattern matching may be performed using equation (9) above, although other geometric pattern matching techniques are also contemplated for use in the method.

Finally, in 708, pattern matching results from 706 may be output, such as to a log, memory, or to an external system, as desired. In one embodiment, the pattern matching results may be used to trigger and/or to direct a resultant action, such as, for example, removing an object from a manufacturing line, or initiating an alarm, among others.

Thus, in various embodiments, normalization of discrete curves using affine arc-length may be used in conjunction with canonical transforms to perform pattern matching between a template image and a target image.

Iterative Normalization and Transformation

The following Algorithm 4 avoids the construction of affine arc-lengths which are based on second derivatives and for that reason are very sensitive to noise. In Algorithm 4 Theorem 1 may be applied iteratively, and the resulting curves re-sampled at each iteration. As before, let a and b be equally sampled discrete curves in the complex plane.

Algorithm 4 (Matching of Discrete Curves a and b Based on Theorem 1):
(4.1) Apply affine transforms (11) to a and b and re-normalize resulting curves according to (10).
(4.2) Re-sample the resulting curves uniformly.
(4.3) Repeat (4.1) and (4.2) one or more times.
(4.4) Match the resulting curves based on (9).
(4.5) Discrete curves a and b match if and only if the final value (9) is 0 or close to 0.

Figure 9:
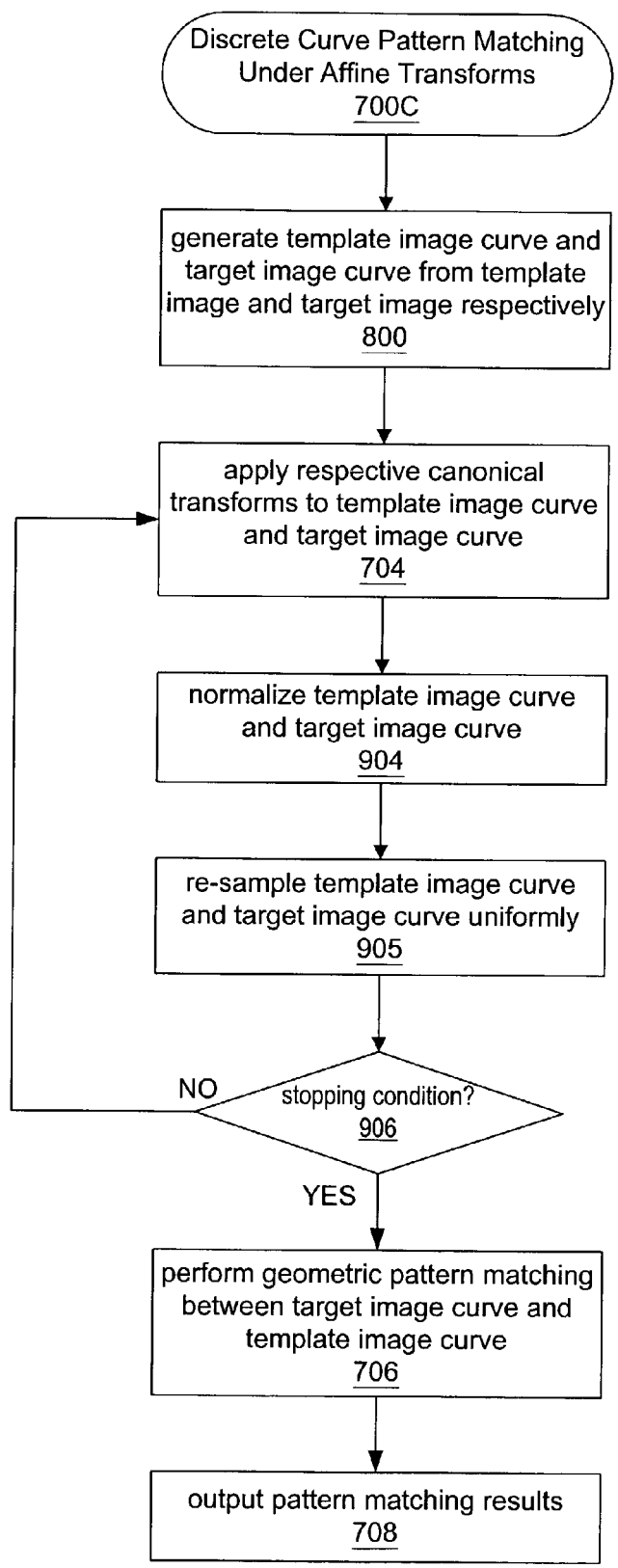
FIG. 9 flowcharts an iterative method for discrete curve pattern matching under affine transforms, according to one embodiment.

FIG. 9—An Iterative Method for Performing Pattern Matching of Discrete Curves

In one embodiment, in the matching process, prior to computing a similarity metric, the method may re-sample the mapped template image discrete curve and the mapped target image discrete curve uniformly. This step may be performed to ensure that the sequence of points representing the curve is in a correct form for calculation of the metric and for comparison of the two curves. More specifically, there may be a general requirement that for valid comparisons between discrete curves, the curves should be of the same (normalized) length, should have the same number of points, and that those points should be uniformly distributed.

In some cases, the normalization process may result in a (possibly small) deviation of the point distribution from uniformity. Similarly, it may be the case that re-sampling the curves may slightly change the length of the curves. Thus, in one embodiment, prior to computing the similarity metric, the curves may be transformed, re-normalized, and re-sampled one or more times in iterative fashion to refine the curves for final comparison. FIG. 9 flowcharts an embodiment of the present invention wherein the steps of transformation, normalization, and re-sampling are performed iteratively to converge upon a match solution, or to converge the curves to a form suitable for comparison.

As mentioned above, in various embodiments, the some of the steps of FIG. 9 may be performed in a different order than shown, or may be omitted. Additional steps may also be performed as desired. Note that where the steps are substantially the same as respective steps of the earlier described methods, the descriptions are abbreviated.

As FIG. 9 shows, in 800 a template image curve and a target image curve may be generated from a template image and a target image, respectively, as described above. Then, in 902, As indicated in 704, respective canonical transforms may be applied to the template image curve and the target image curve. In one embodiment, the canonical transforms may be computed based on the template image curve and the target image curve, respectively, according to equation (8), as described above.

Then, in 904, the mapped template image curve and the mapped target image curve may then be normalized, e.g., in accordance with equations (10), above. In other words, in one embodiment, the two discrete curves may be normalized with respect to position (e.g., average position=0) and energy (energy=1). In other embodiments, other normalization schemes may be used to normalize the two discrete curves.

Once the transformed curves have been normalized in 904, then in 905 the template image curve and the target image curve may be re-sampled. In a preferred embodiment, the curves may be re-sampled uniformly.

Then, in 906, a determination may be made as to whether a stopping condition exists. In other words, the method may test for termination criteria. If conditions for termination not met, then the method may return to step 902 as shown in FIG. 9, and the method may continue as described above, iterating until the termination criteria are met. In one embodiment, the respective canonical transformations for each curve may be recomputed for each iteration, e.g., based on the respective new versions of the curves at each iteration.

If the stopping conditions are met in 906, then in 706, geometric pattern matching maybe performed between the template image curve and the target image curve. Any of various geometric pattern matching techniques may be applied to perform the geometric pattern matching. For example, in one embodiment, equation (9) may be used to match the curves, where a value of 0 (or a value near 0) indicates a match. It is noted than in the methods described above, the application of the canonical transform to the curves may convert affine transform differences between the curves to scaling, translation, and rotational differences, as mentioned above in the Theory section. Additionally, normalizing the curve lengths to 1 may remove scaling differences between the curves, and normalizing the average position to zero may remove translation differences. Thus, the only issue that may need to be resolved is possible rotations between the curves. Equation (9) may thus be used to perform rotation invariant pattern matching between the two curves. As described above, equation (9) may comprise a similarity metric which indicates a "distance" between the curves, where small or no difference/distance indicates a match.

Finally, after the geometric pattern matching has been perform in 706, pattern matching results may be output, as indicated in 708, and described above.

Note that in some embodiments, the termination criteria of 906 may be based on the behavior of $d(\bar{a},\bar{b})$, i.e., equation (9). For example, if this value cannot be improved significantly, the iteration may be stopped. In other words, the curves may be iteratively processed as described above until the metric computed in equation (9) fails to substantially improve. Note that in one embodiment, when equation (9) is used in this capacity, the geometric pattern matching of 706 is included in 906, and thus may be omitted as a separate step since the computation of the termination criteria may in effect comprise the geometric pattern matching.

Figure 10:
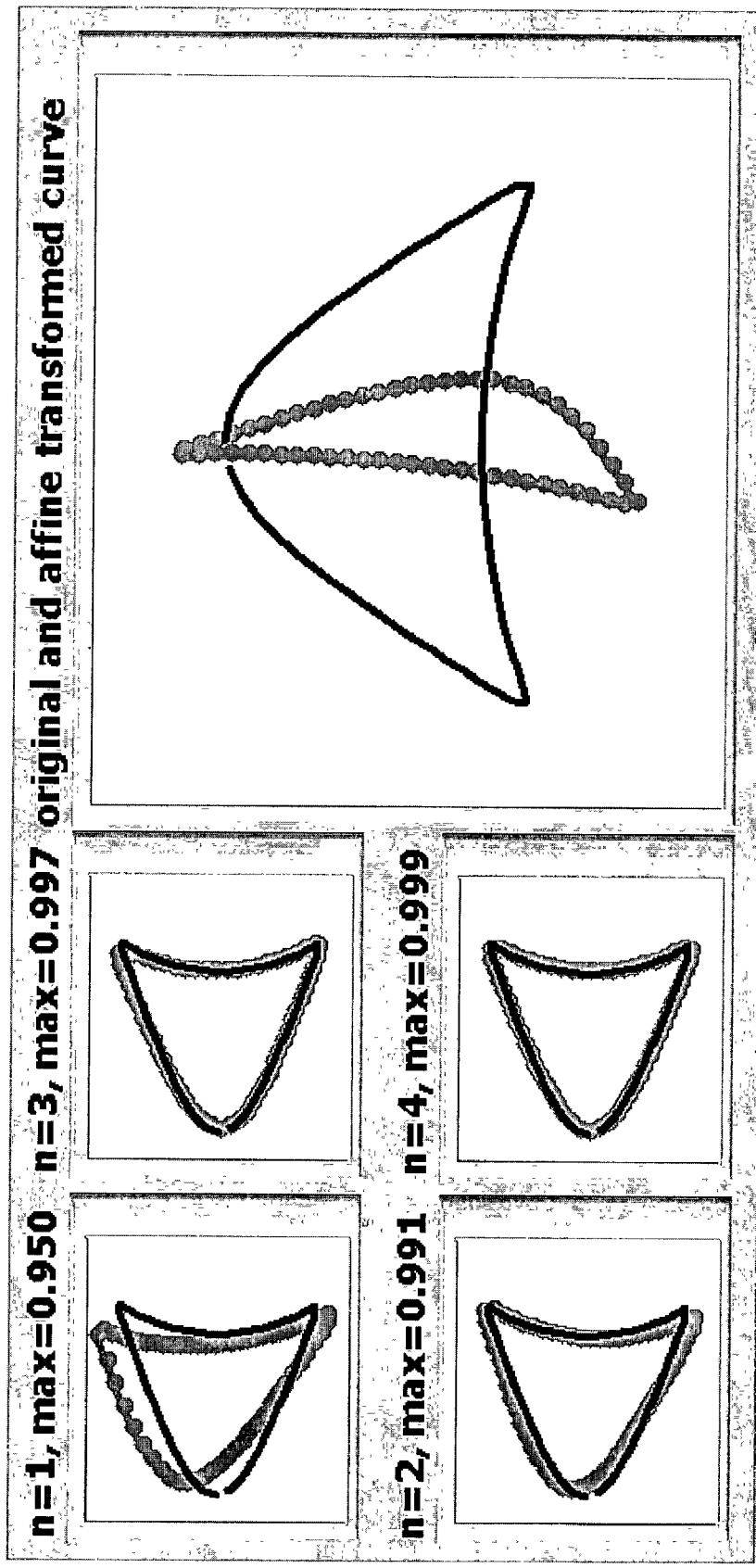
FIG. 10 illustrates the results of the iterative method of FIG. 9, according to one embodiment.

In another embodiment, equation (9) may be used in a slightly different manner. Instead of computing $d(\bar{a},\bar{b})$ for the two curves a and b, the metrics $d(\bar{a},\bar{a}')$ and $d(\bar{b},\bar{b}')$ may be calculated, where a and a' refer to successive versions of curve a in the iteration (and the same for curve b). Thus, over one or more iterations, each curve may converge to a form suitable for comparison. It is noted that typically only a few iterations (e.g., 1, 2, 3, etc.) are needed to converge each curve to a substantially stable form, as shown in FIG. 10 and described below.

Thus, as FIG. 9 shows, in one embodiment, the template curve canonical transform and the target curve canonical transform may be applied respectively to the template image discrete curve and the target image discrete curve. The mapped (i.e., transformed) template image discrete curve and the mapped target image discrete curve may then be re-normalized. The mapped template image discrete curve and the mapped target image discrete curve may then both be re-sampled uniformly. These steps may be performed iteratively one or more times, where, at each successive iteration, the mapped template and target discrete curves from the preceding iteration may be used as the template and target image discrete curves in the current iteration.

The iteration may proceed until a stopping condition is met. For example, the stopping conditions may be when a specified number of iterations has been performed, e.g., 2 or 3. As another example, a metric may be computed for each curve after each iteration, and once the change in the value of the metric is less than some threshold value, the iteration may be stopped. In other words, with iteration, each curve may converge to a form suitable for comparison, therefore, the amount of correction for each curve per iteration may decrease until some threshold is reached. Once each curve has converged to the degree desired, the curves may be compared (via the similarity metric described above), and the results stored or output to an external system.

It should be noted that although in the methods presented herein a single target image is considered, the methods apply equally to situations involving multiple target images, e.g., a succession of acquired target images. Similarly, a target image may comprise a plurality of image objects which may be represented by a corresponding plurality of target image discrete curves, each of which may be analyzed, compared, and possibly matched, in accordance with the described techniques.

FIG. 10—Convergence of Transformed and Normalized Discrete Curve

FIG. 10 illustrates successive versions of a discrete curve under iterative transformation, normalization, and re-sampling, as described above with reference to FIG. 9. In other words, in FIG. 10, Algorithm 4 from above is applied to a specific curve (the gray curve in FIG. 10), where at each iteration the transformed curve more closely matches the other curve (black curve in FIG. 10). The original discrete curves are shown in the right-most portion of the Figure.

As mentioned above, criterion (4.3) could be controlled by the behavior of d based on (9), e.g. the process may stop if and only if successive iterations a' of a and b' of b satisfy inequalities $d(a,a')<e$ and $d(b,b')<e$, where e is a small positive constant. In FIG. 10, max stands for 1−d. In other words, values of max close to 1 represent small distances between the curves. As may be seen, after only 4 iterations, a substantial match is apparent between the two curves.

Figure 11:
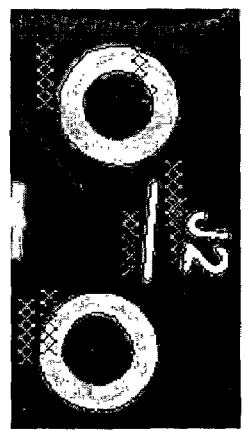
FIG. 11 illustrates a typical acquired image in a machine vision application.
Figure 12:
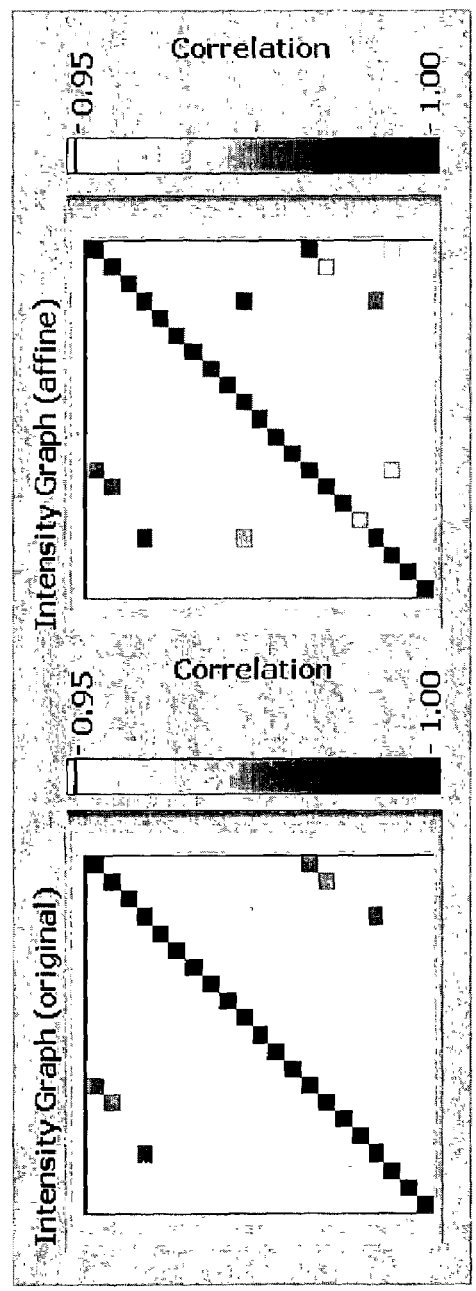
FIG. 12 illustrates a comparison of two approaches to affine pattern matching.

FIGS. 11 and 12—Comparison of Methods Based on Algorithms 3 and 4

Below, affine pattern matching methods based on Algorithms 3 and 4 are analyzed and compared with regard to robustness and run-time behavior. Both algorithms were checked against a database consisting of shapes that can be regarded as typical situations in geometric pattern matching (machine vision). In particular, discrete curves acquired by edge detection were translated into affine versions. Noise was added to both the original shape and the affine one. The affine transforms were chosen randomly.

FIG. 11 illustrates a typical acquired image in a machine vision application. As FIG. 11 shows, the essential (detected) shapes are marked. As noted above, changing camera positions can be interpreted as affine transforms of this image.

FIG. 12 depicts a typical result of such a test run using a pattern matching method based on Algorithm 4. In this example, the program identifies 21 shapes (discrete closed curves) and builds up a cross-correlation matrix of (Euclidean) similarities between them (left part of FIG. 12). The outliers represent shapes that look alike, e.g. rectangles and slightly bent versions of them. The cross-correlation matrix on the right compares the same curves after applying randomly chosen affine transforms where a pattern matching method based on Algorithm 4 is used to compute affine distances between these new objects. The straight line (diagonal) represents comparisons of curves (shapes) with themselves. The affine versions are re-sampled discrete curves, and therefore, there is not a one-to-one relation between corresponding points. The latter is a realistic requirement since synchronous sampling can not be guaranteed in real-world situations. In the example shown, a twofold application of step (4.4) (i.e., iterating twice) produces high quality matches. Additionally, the described method is robust in handling noise and requires relatively few computer resources.

Based on results derived from experiments, the method based on Algorithm 3 appears to perform significantly worse than the method based on Algorithm 4 unless the curves have ideal mathematical shapes, which is rarely the case in machine vision applications. It is, however, noted that an exception to this rule relates to the class of polygons where affine arc-lengths are successfully used to measure the distance between shapes (see Huttenlocher and Kedem [1990]). Moreover, the method used in Algorithm 3 is extremely sensitive to noise, given that second derivatives must be computed to generate affine arc-lengths. Thus, typically, the results generated using Algorithm 3 may be worse than shown in FIG. 12. Additionally, Algorithm 4 performs significantly faster than Algorithm 3. Therefore, although Algorithm 3 is theoretically interesting and may be suitable for some application, in most real-world situations, such as creating a product for use in a factory, methods based on Algorithm 4 may be preferable to those based on Algorithm 3.

Thus, various embodiments of the systems and methods described herein may provide means for performing pattern matching of discrete curves under affine transformations. As also described herein, in various embodiments, prior to performing pattern matching, the curves may be normalized (and optionally re-sampled) based on length, average position, number of points, and/or a computed affine arc-length, as desired. It is noted that various embodiments of the systems and methods described herein may be applicable in a variety of fields, including, but not limited to, science, engineering, medicine, manufacturing, robotics, machine vision, measurement, control, and surveillance, among others.

Note: A White Paper titled "Matching of Discrete Curves Under Affine Transforms" by Lothar Wenzel is included at the end of this document as Appendix A.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for determining the presence of an object of interest in a target image, the method comprising:
acquiring the target image;
determining a target image discrete curve from the target image, wherein the target image discrete curve corresponds to a respective object in the target image;
determining a target curve transform based on the target image discrete curve;
applying the target curve transform to the target image discrete curve to generate a mapped target image discrete curve;
performing geometric pattern matching on the mapped target image discrete curve and a mapped template image discrete curve, wherein the mapped template image discrete curve corresponds to the object of interest; and
generating pattern matching results based on said geometric pattern matching.

2. The method of claim 1, further comprising:
normalizing the mapped target image discrete curve prior to said performing geometric pattern matching.

3. The method of claim 1, wherein said determining the target image discrete curve comprises:
determining an initial discrete curve from the target image, wherein the initial discrete curve corresponds to the respective object in the target image;
normalizing the initial discrete curve; and
re-sampling the initial discrete curve to generate the target image discrete curve.

4. The method of claim 3, wherein said normalizing and re-sampling the initial discrete curve comprises:
computing an affine arc-length based on the initial discrete curve; and
re-sampling the initial discrete curve based on the computed affine arc-length.

5. The method of claim 1,
wherein said applying the target curve transform to the target image discrete curve to generate the mapped target image discrete curve comprises:
applying the target curve transform to each point in the target image discrete curve to generate corresponding points in the mapped target image discrete curve.

6. The method of claim 1, further comprising:
receiving a template image;
determining a template image discrete curve, wherein the template image discrete curve corresponds to the object of interest in the template image;
determining a template curve transform based on the template image discrete curve; and
applying the template curve transform to the template image discrete curve to generate the mapped template image discrete curve.

7. The method of claim 6, wherein said determining the template image discrete curve comprises:
determining an initial discrete curve from the template image, wherein the initial discrete curve corresponds to the object of interest in the template image;
normalizing the initial discrete curve; and
re-sampling the initial discrete curve to generate the template image discrete curve.

8. The method of claim 7, wherein said normalizing and said re-sampling the initial discrete curve comprises:
computing an affine arc-length based on the initial discrete curve; and
re-sampling the initial discrete curve based on the computed affine arc-length.

9. The method of claim 6, wherein said receiving the template image, said determining the template image discrete curve, said determining the template curve transform based on the template image discrete curve, and said applying the template curve transform to the template image discrete curve are performed prior to said acquiring the target image.

10. The method of claim 6,
wherein the target image discrete curve is an affine transformed version of the template image discrete curve; and
wherein, after said applying the template curve transform to the template image discrete curve and applying the target curve transform to the target image discrete curve, the resulting mapped target image discrete curve and mapped target image discrete curve differ by one or more of:
a translation; and
a 2D rotation.

11. The method of claim 6, wherein said template curve transform and said target curve transform respectively operate to transform the template image discrete curve and the target image discrete curve into a form wherein an affine relationship between the target image discrete curve and the template image discrete curve is converted to a Euclidean relationship between the mapped target image discrete curve and the mapped template image discrete curve.

12. The method of claim 6, wherein said performing geometric pattern matching on the mapped target image discrete curve and a mapped template image discrete curve comprises:
computing a similarity metric for the mapped template image discrete curve and the mapped target image discrete curve; and
comparing the similarity metric for the mapped template image discrete curve and the mapped target image discrete curve to a match value, wherein the similarity metric having a value of approximately the match value indicates a substantial match between the template image discrete curve and the target image discrete curve.

13. The method of claim 12, further comprising, prior to said computing a similarity metric, performing:
re-sampling the mapped template image discrete curve uniformly; and
re-sampling the mapped target image discrete curve uniformly.

14. The method of claim 12, further comprising, prior to said computing a similarity metric, iteratively performing one or more times:
applying the template curve transform to the mapped template image discrete curve;
applying the target curve transform to the mapped target image discrete curve;
normalizing the mapped template image discrete curve;
normalizing the mapped target image discrete curve;
re-sampling the mapped normalized template image discrete curve uniformly; and
re-sampling the mapped normalized target image discrete curve uniformly;
wherein, at each successive iteration, the mapped template and target discrete curves from the preceding iteration are used as the mapped template and target image discrete curves.

15. The method of claim 14, wherein said iteratively performing one or more times comprises iterating until a stopping condition is met.

16. The method of claim 15, wherein said stopping condition comprises the value of a computed metric matching or exceeding a threshold value.

17. The method of claim 1, further comprising:
normalizing the mapped template image discrete curve prior to said performing geometric pattern matching.

18. The method of claim 1, wherein the target image discrete curve, the mapped target image discrete curve, and the mapped template image discrete curve comprise closed curves.

19. The method of claim 1, wherein the target image discrete curve, the mapped target image discrete curve, and the mapped template image discrete curve comprise open curves.

20. A computer readable medium which stores program instructions for determining the presence of an object of interest in a target image, wherein the program instructions are executable to perform:
acquiring the target image;
determining a target image discrete curve from the target image, wherein the target image discrete curve corresponds to a respective object in the target image;
determining a target curve transform based on the target image discrete curve;
applying the target curve transform to the target image discrete curve to generate a mapped target image discrete curve;
performing geometric pattern matching on the mapped target image discrete curve and a mapped template image discrete curve, wherein the mapped template image discrete curve corresponds to the object of interest; and
generating pattern matching results based on said geometric pattern matching.

21. The computer readable medium of claim 20, wherein the program instructions are further executable to perform:
normalizing the mapped target image discrete curve prior to said performing geometric pattern matching.

22. The computer readable medium of claim 21, wherein said normalizing and re-sampling the initial discrete curve comprises:
computing an affine arc-length based on the initial discrete curve; and
re-sampling the initial discrete curve based on the computed affine arc-length.

23. The computer readable medium of claim 20, wherein said determining the target image discrete curve comprises:
determining an initial discrete curve from the target image, wherein the initial discrete curve corresponds to the respective object in the target image;
normalizing the initial discrete curve; and
re-sampling the initial discrete curve to generate the target image discrete curve.

24. The computer readable medium of claim 20, wherein the program instructions are further executable to perform:
receiving a template image;
determining a template image discrete curve, wherein the template image discrete curve corresponds to the object of interest in the template image;
determining a template curve transform based on the template image discrete curve; and
applying the template curve transform to the template image discrete curve to generate the mapped template image discrete curve.

25. The computer readable medium of claim 24, wherein the program instructions are further executable to perform:
normalizing the mapped template image discrete curve prior to said performing geometric pattern matching.

26. The computer readable medium of claim 25, wherein said determining the template image discrete curve comprises:
determining an initial discrete curve from the template image, wherein the initial discrete curve corresponds to the object of interest in the template image;
normalizing the initial discrete curve; and
re-sampling the initial discrete curve to generate the template image discrete curve.

27. The computer readable medium of claim 26, wherein said normalizing and said re-sampling the initial discrete curve comprises:

computing an affine arc-length based on the initial discrete curve; and re-sampling the initial discrete curve based on the computed affine arc-length.

28. The computer readable medium of claim 24,
wherein the target image discrete curve is an affine transformed version of the template image discrete curve; and
wherein, after said applying the template curve transform to the template image discrete curve and applying the target curve transform to the target image discrete curve, the resulting mapped target image discrete curve and mapped target image discrete curve differ by one or more of:
a translation; and
a 2D rotation.

29. The computer readable medium of claim 24, wherein said template curve transform and said target curve transform respectively operate to transform the template image discrete curve and the template image discrete curve into a form wherein an affine relationship between the target image discrete curve and the template image discrete curve is converted to a Euclidean relationship between the mapped target image discrete curve and the mapped template image discrete curve.

30. The computer readable medium of claim 24, wherein said performing geometric pattern matching on the mapped target image discrete curve and a mapped template image discrete curve comprises:
computing a similarity metric for the mapped template image discrete curve and the mapped target image discrete curve; and
comparing the similarity metric for the mapped template image discrete curve and the mapped target image discrete curve to a match value, wherein the similarity metric having a value of approximately the match value indicates a substantial match between the template image discrete curve and the target image discrete curve.

31. The computer readable medium of claim 30, wherein, prior to said computing a similarity metric, the program instructions are further executable to perform:
re-sampling the mapped template image discrete curve uniformly; and
re-sampling the mapped target image discrete curve uniformly.

32. The computer readable medium of claim 30, wherein, prior to said computing a similarity metric, the program instructions are further executable to iteratively perform one or more times:
applying the template curve transform to the mapped template image discrete curve;
applying the target curve transform to the mapped target image discrete curve;
normalizing the mapped template image discrete curve;
normalizing the mapped target image discrete curve;
re-sampling the mapped template image discrete curve uniformly; and
re-sampling the mapped target image discrete curve uniformly;
wherein, at each successive iteration, the mapped template and target discrete curves from the preceding iteration are used as the mapped template and target image discrete curves.

33. The computer readable medium of claim 20, wherein the target image discrete curve, the mapped target image discrete curve, and the mapped template image discrete curve comprise closed curves.

34. The computer readable medium of claim 20, wherein the target image discrete curve, the mapped target image discrete curve, and the mapped template image discrete curve comprise open curves.

35. A system for determining the presence of an object of interest in a target image, the system comprising:
a computer system, comprising:
a processor; and
a memory medium coupled to the processor, wherein the memory medium stores program instructions; and
an input coupled to the memory medium and the processor;
wherein the input is operable to:
receive a target point sequence from a target image; and
wherein the program instructions are executable to:
determine a target sequence transform based on the target point sequence;
apply the target sequence transform to the received target point sequence to generate a mapped target point sequence; and
perform geometric pattern matching using a mapped template point sequence and the mapped target point sequence to generate pattern matching results, wherein the mapped template image point sequence corresponds to the object of interest.

36. The system of claim 35,
wherein the input is further operable to:
receive a template point sequence; and
wherein the program instructions are further executable to:
determine a template sequence transform based on the template point sequence; and
apply the template sequence transform to the template point sequence to generate the mapped template point sequence.

37. The system of claim 36, wherein, after said applying the template sequence transform to the template point sequence, and applying the target sequence transform to the target point sequence, the program instructions are further executable to:
normalize the mapped template point sequence; and
normalize the mapped target point sequence.

38. The system of claim 37, wherein the program instructions are further executable to iteratively perform the following steps zero or more times:
apply the template sequence transform to the template discrete curve to generate a mapped normalized template image discrete curve;
apply the target sequence transform to the target discrete curve to generate a mapped normalized target discrete curve;
normalize the template discrete curve;
normalize the target discrete curve;
re-sample the mapped template discrete curve uniformly; and
re-sample the mapped normalized target discrete curve uniformly;
wherein, at each successive iteration, the template and target discrete curves from the preceding iteration are used as the template and target discrete curves respectively.

39. The system of claim 36, wherein, prior to said applying the template sequence transform to the template point sequence, and applying the target sequence transform to the target point sequence, the program instructions are further executable to:
  normalize the template point sequence; and
  normalize the target point sequence.

40. The system of claim 36,
  wherein said template point sequence comprises a template discrete curve;
  wherein said target point sequence comprises a target discrete curve; and
  wherein, prior to said applying the template sequence transform to the template point sequence, and applying the target sequence transform to the target point sequence, the program instructions are further executable to:
    re-sample the template discrete curve uniformly; and
    re-sample the target discrete curve uniformly.

41. The system of claim 40, wherein, in said re-sampling the template discrete curve uniformly and said re-sampling the target discrete curve uniformly, the program instructions are further executable to:
  compute an affine arc-length based on the template discrete curve;
  re-sample the template discrete curve based on the computed affine arc-length;
  compute an affine arc-length based on the target discrete curve; and
  re-sample the target discrete curve based on the computed affine arc-length.

42. The system of claim 35, wherein the target image discrete curve, the mapped target image discrete curve, and the mapped template image discrete curve comprise closed curves.

43. The system of claim 35, wherein the target image discrete curve, the mapped target image discrete curve, and the mapped template image discrete curve comprise open curves.

44. A system for determining the presence of an object of interest in a target image, the system comprising:
  means for receiving a template point sequence;
  means for determining a template sequence transform based on the template point sequence;
  means for applying the template sequence transform to the template point sequence to generate a mapped template point sequence, wherein the mapped template image point sequence corresponds to the object of interest;
  means for receiving a target point sequence;
  means for determining a target sequence transform based on the template point sequence;
  means for applying the target sequence transform to the target point sequence to generate a mapped target point sequence; and
  means for performing geometric pattern matching using the mapped template point sequence and the mapped target point sequence; and
  means for generating pattern matching results based on said geometric pattern matching.

45. A method for matching discrete curves, comprising:
  determining a template transform based on a template image;
  determining one or more target transforms based respectively on one or more target images;
  performing geometric pattern matching on the one or more target images using the template transform and the one or more target transforms to generate pattern matching results; and
  outputting the pattern matching results.

46. The method of claim 45, wherein said performing geometric pattern matching comprises:
  applying the template transform to a template image discrete curve from the template image to generate a mapped template image discrete curve;
  applying the respective target transform to each of the one or more target image discrete curves to generate a corresponding one or more mapped target image discrete curves;
  computing a similarity metric for the mapped template image discrete curve and each of the one or more mapped target image discrete curves; and
  comparing the similarity metric for the mapped template image discrete curve and each of the one or more mapped target image discrete curves to a match value, wherein each respective similarity metric having a value of approximately the match value indicates a substantial match between the template image discrete curve and the respective target image discrete curve.

* * * * *